United States Patent [19]

Kaufmann et al.

[11] Patent Number: 4,927,595
[45] Date of Patent: May 22, 1990

[54] REFUELING OF NUCLEAR REACTOR

[75] Inventors: John W. Kaufmann, Murrysville; Kenneth J. Swidwa, Harmar Township, Allegheny County; Leonard P. Hornak, North Huntingdon, all of Pa.

[73] Assignee: Westinghouse Electric Corp., Pittsburgh, Pa.

[21] Appl. No.: 234,112

[22] Filed: Aug. 19, 1988

Related U.S. Application Data

[62] Division of Ser. No. 382,269, May 26, 1982, Pat. No. 4,832,902.

[51] Int. Cl.$^5$ .............................................. G21C 19/00
[52] U.S. Cl. .................................................... 376/268
[58] Field of Search ............... 376/268, 271, 264, 262, 376/463; 294/906

[56] References Cited

U.S. PATENT DOCUMENTS

| | | | |
|---|---|---|---|
| 4,311,557 | 1/1982 | Kowalski et al. | 376/271 |
| 4,511,531 | 4/1985 | Swidwa et al. | 376/271 |
| 4,832,902 | 5/1989 | Kaufmann et al. | 376/268 |

Primary Examiner—Daniel Wasil
Attorney, Agent, or Firm—H. Diamond

[57] ABSTRACT

Refueling apparatus for a nuclear reactor including a bridge and a trolley movable at right angles to each other over a pit. The trolley carries a mast assembly for engaging, raising, lowering reactor component assemblies.

The mast assembly carries electric cables and compressed air hoses from electric and air driven components on the mast and is rotatable relative to the trolley. The cables and hoses are passed from the mast assembly through a flexible cable tray which is oriented with its cable-carrying slot vertically in the configuration generally of an S. The cable tray is connected to the mast at one of its ends, is partly wound around the mast from that end and departs from the mast a predetermined distance at the opposite end. The tray remains fixed at the opposite end as it is wound on or unwound from the mast, so that the cables and hoses as they pass from the opposite end to electrical and air terminals as the trolley remains anchored at the opposite end.

The winch and the reels for cables and hoses are mounted on the rotatable mast. On rotation of the mast, these reels with the parts that they carry and the air hose are carried along by the rotation. The fouling of the cables or hoses by the conductors is precluded.

16 Claims, 20 Drawing Sheets

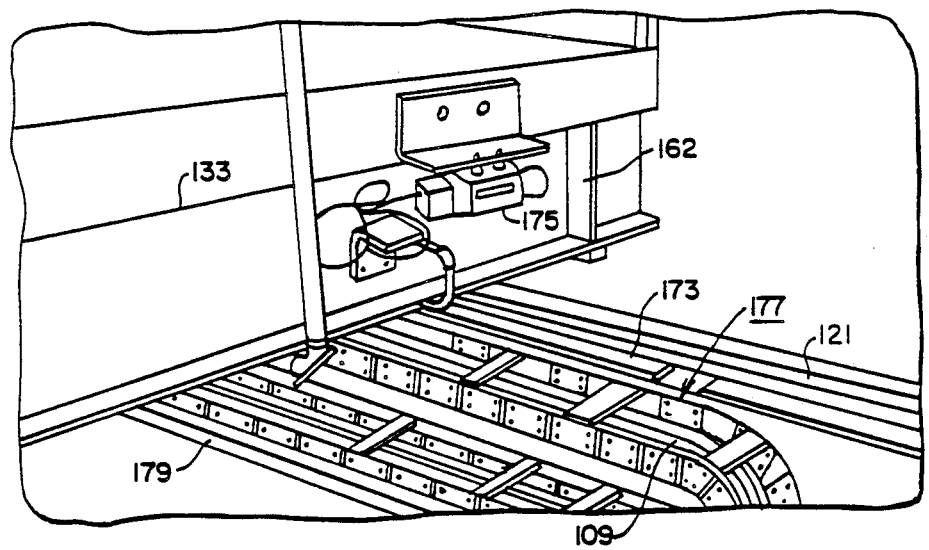
FIG.8
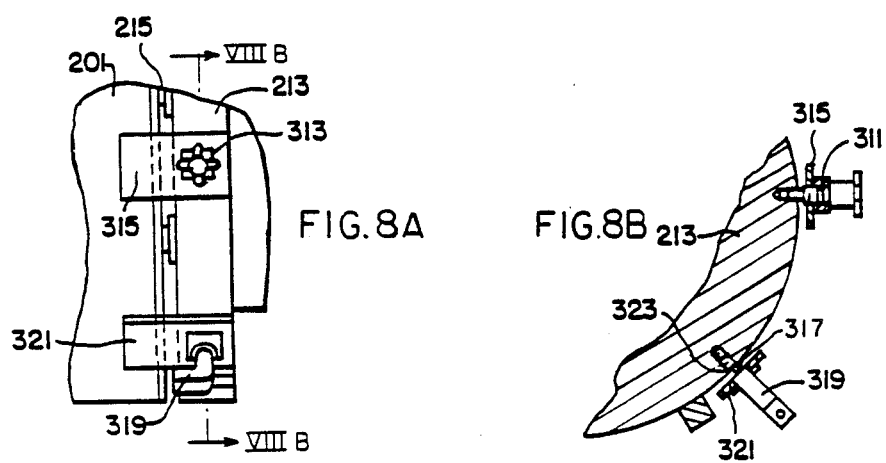
FIG.8A
FIG.8B

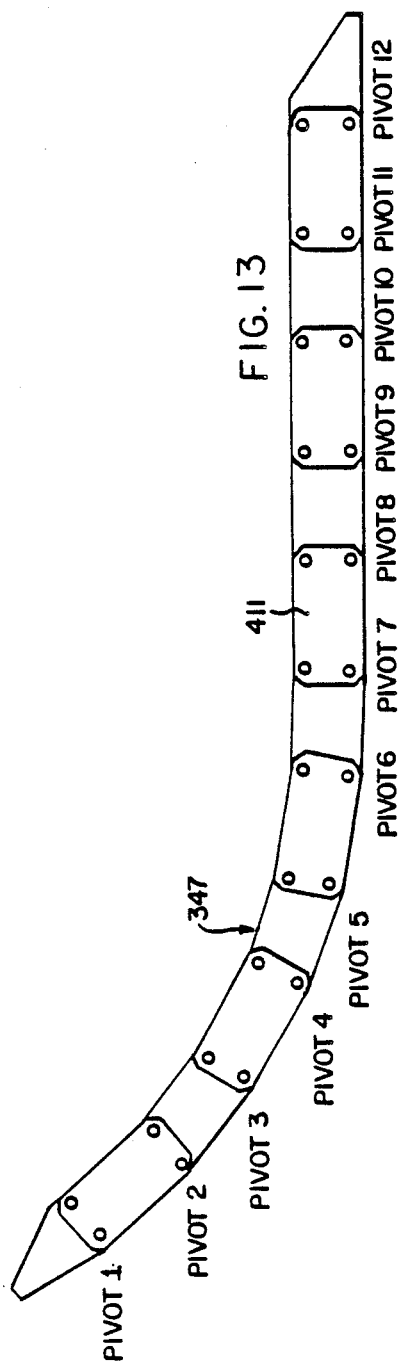
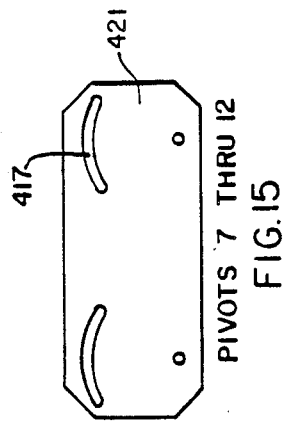
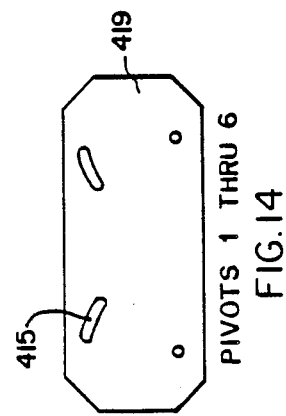

REFUELING OF NUCLEAR REACTOR

This is a division of application Ser. No. 06/382,269 filed May 26, 1982, now U.S. Pat. No. 4,832,902 granted May 23, 1989.

CROSS-REFERENCE TO RELATED APPLICATION

Application Ser. No. 336,631, filed Apr. 8, 1982, now U.S. Pat. No. 4,511,531 granted Apr. 16, 1985 to Kenneth J. Swidwa, Leonard P. Hornak and Edward F. Kowalski for Transfer of Nuclear Reactor Component Assemblies and assigned to Westinghouse Electric Corporation (herein Swidwa) is incorporated herein by reference.

This application is a division of application Ser. No. 382,269 filed May 26,1982, now U.S. Pat. No. 4,832,902.

BACKGROUND OF THE INVENTION

This invention relates to the art of nuclear reactor power plants. It has particular relationship to the refueling of the reactors of such plants. In carrying out the refueling, the reactor to be refueled is at the base of a pit in a containment filled with water to a depth of 20 or 30 feet. During refueling, component assemblies of the reactor or from refueling racks are engaged by grippers or grapples of a mast assembly, raised, transported from their position of origin and lowered in the position where they are to be deposited. The component assemblies are highly radioactive and are engaged, raised, transported and lowered under a substantial depth of water. To carry out this operation, there is provided apparatus including a bridge moveable along a track on the containment. A trolley is moveable on a track on the bridge. The trolley carries a mast assembly having a rotatable supporting mast from which the component-assembly engaging-raising-and-lowering means is suspended. This means is sometimes herein referred to as "component-assembly handling mechanism" or "assembly-handling mechanism" or simply "mechanism". With the bridge and trolley at selectably different positions along their tracks, the mast assembly is suspended with the assembly-handling mechanisms at selectably different positions of the area of the pit or of the reactor within the pit.

The mast assembly includes a supporting mast from which the component-assembly-handling mechanisms are suspended. To accommodate component assemblies that are out of position radially, the supporting mast and the mechanisms suspend from it are rotatable in a bearing member secured to the trolley. The mechanisms on the mast assembly include electric and fluid-pressure operable means to which electricity and fluid must be supplied. Electric power is derived from an outlet on the containment. The cable from this outlet through which the power flows extends to the bridge through festoon loops which permit movement of the bridge. From the bridge the cable extends to the trolley where it supplies power to a control console. The electrically operable means on the mechanisms of the mast assembly are connected through wires and other facilities to the control console on the trolley where they derive their power. Typically, the pressure fluid is compressed and derived from a compressor on a bridge and supplied through an air conductor or hose. The air hose extends to the trolley whence it extends to the mast assembly and is connected to the fluid-pressure operable means on the mechanisms of the mast assembly.

Electric conductors may be designated variously as "cables" or "wires". The word "cables" is frequently applied to members which include a number of different electric conductors that conduct different currents and are insulated from each other. At times the word "conduit" is used to describe a tube including a number of wires. Conductors of fluids are often designated as "hoses"; "air hoses" or "water hoses" or the like. In this application and particularly in the claims the words "conductor" or "electric conductor" or "fluid conductor" will at times be used to designate generally cables or wire or conduits which conduct electric current or hoses which conduct fluids.

Since the mast assembly is rotatable relative to the trolley, provisions must be made in the electric and fluid conductors between the trolley and the mast assembly to permit this relative motion. In accordance with the teachings of the prior art the electric and fluid conductors are grouped together, mounted on a support on the trolley and extended to the rotatable mast assembly. To permit relative movement of the mast assembly and trolley a long festoon loop must be interposed in the grouped conductors between the support and mast assembly. It is necessary that this loop have a point of attachment on the support which is high in the apparatus. This is undesirable. In addition, the fluid and electric conductors are subject to twisting when the mast assembly is rotated.

The hoist which raises or lowers the component-assembly-handling mechanisms has cables connected to the mast assembly through swivel joints. The cables are wound or unwound from a hoist drum and remain aligned during raising or lowering. During lowering the fluid and electric conductors connected to the mechanisms must be payed out or let out and during raising of the mechanisms these conductors must be retracted. To permit the resulting changes in the lengths of the fluid and electric conductors, these conductors are wound on reels. In accordance with the teachings of the prior art, the mast assembly is rotated relative to the hoist a nd conductor reels. In such a structure the fluid and electric lines turn with the mast assembly. The turning of these conductors limit the rotation of the mast assembly. In addition the conductors may foul the hoist cables.

It is the object of this invention to overcome the difficulties and drawbacks of the prior art.

It is another object of this invention to provide refueling apparatus which shall not require a long festoon loop in the fluid and electric conductors between the trolley and the rotatable mast and in whose operations these conductors shall not be twisted. A third object of this invention is to provide refueling apparatus in whose operation rotation of the mast assembly shall not be restricted by the fluid and electric conductors and fouling of the hoist cables by these conductors on rotation of the mast assembly relative to the trolley shall be precluded.

SUMMARY OF THE INVENTION

To preclude the necessity of a festoon loop in the fluid and electric conductors, between the supporting mast and the trolley, and the twisting of these conductors on rotation of the mast relative to the trolley, a cable tray is provided on the mast. A suitable cable tray is sold under the trademark CATRAC by Gemco Electric of 1080 N. Crooks Road, Clawson, Mich. The cable tray is mounted on the mast with its slot through which the cables are passed vertically. It is connected to the mast at one end, extends at least partly around the periphery of the mast and departs from the mast and terminates at a position displaced from the mast a predetermined distance. Typically the cable tray has the configuration of an S. The cable tray is interposed between the components on the mast, to which the fluid and electric conductors are connected, and the trolley. The conductors are passed through the cable tray. As the mast is rotated in one direction relative to the trolley, the tray and the conductors which it carries are wound on the mast and as it is rotated in the opposite direction the tray and the conductors are unwound from the mast.

Typically the end of cable tray connected to the mast is entered by the portions of the conductors from the parts on the mast; the portion of the conductors connected to the parts on the trolley leave the tray at the opposite end. The portions of the conductors betweent he parts on the mast and on the tray, at the end where the tray is connected to the mast, are rotatable with the mast. The portions of the conductors between the other end of the cable tray and the parts in the trolley are not moved.

In accordance with this invention the hoist and the reels for the fluid and electric conductors are mounted on the supporting mast and are rotatable with the supporting mast and the component-assembly handling mechanisms. There is no relative motion to cause interferences between the hoist cables and the fluid and electric conductors. The rotation of the supporting mast is not limited and the mast cables are not fouled by the conductors.

BRIEF DESCRIPTION OF THE DRAWINGS

For a better understanding of this invention, both as to its organization and as to its methof operation, together with additional objects and advantages thereof, reference is made to the following description taken in connection with the accompanying drawings, in which:

FIG. 8 is a copy of a photograph showing the cable tray between the bridge nad trolley; FIG. 8A is a fragmental view enlarged of the portion of FIG. 3 in circle VIIIA of FIG. 3;

FIG. 8B is a fragmental view in longitudinal section taken along line VIIIB—VIIIB of FIG. 8A;

FIG. 13 is a view in side elevation of a cable tray used in the practice of this invention;

FIG. 14 is a view in side elevation of the pivot plates on which the outer plates nearest the end secured to the mast pivot;

FIG. 15 is a view in side elevation of the pivot plates on which the outer plates near the opposite end pivot;

DETAILED DESCRIPTION OF THE EMBODIMENT

Figure 1:
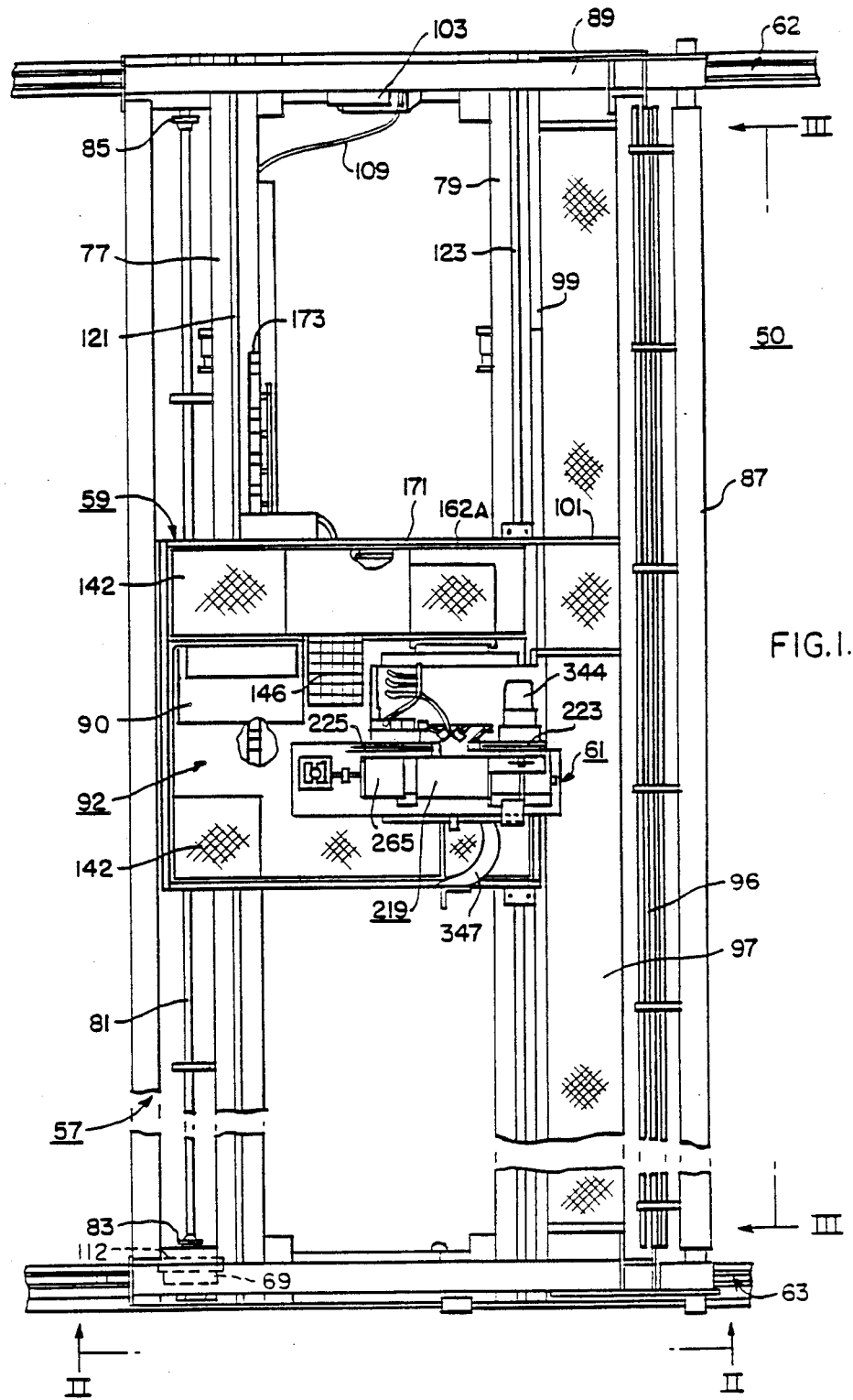
FIG. 1 is a plan view of apparatus in accordance with the invention.

The apparatus 50 for refueling a nuclear reactor shown in the drawings serves to engage selected component assemblies of a nuclear reactor 51 (FIG. 3), raise these assemblies, transport them and lower them into a selected position. The general operation of this apparatus 50 and the purposes which it serves is disclosed in Swidwa. The reactor 51 is disposed under water 53, 20 or 30 feet in depth in a containment defined by massive walls 55.

Figure 2:
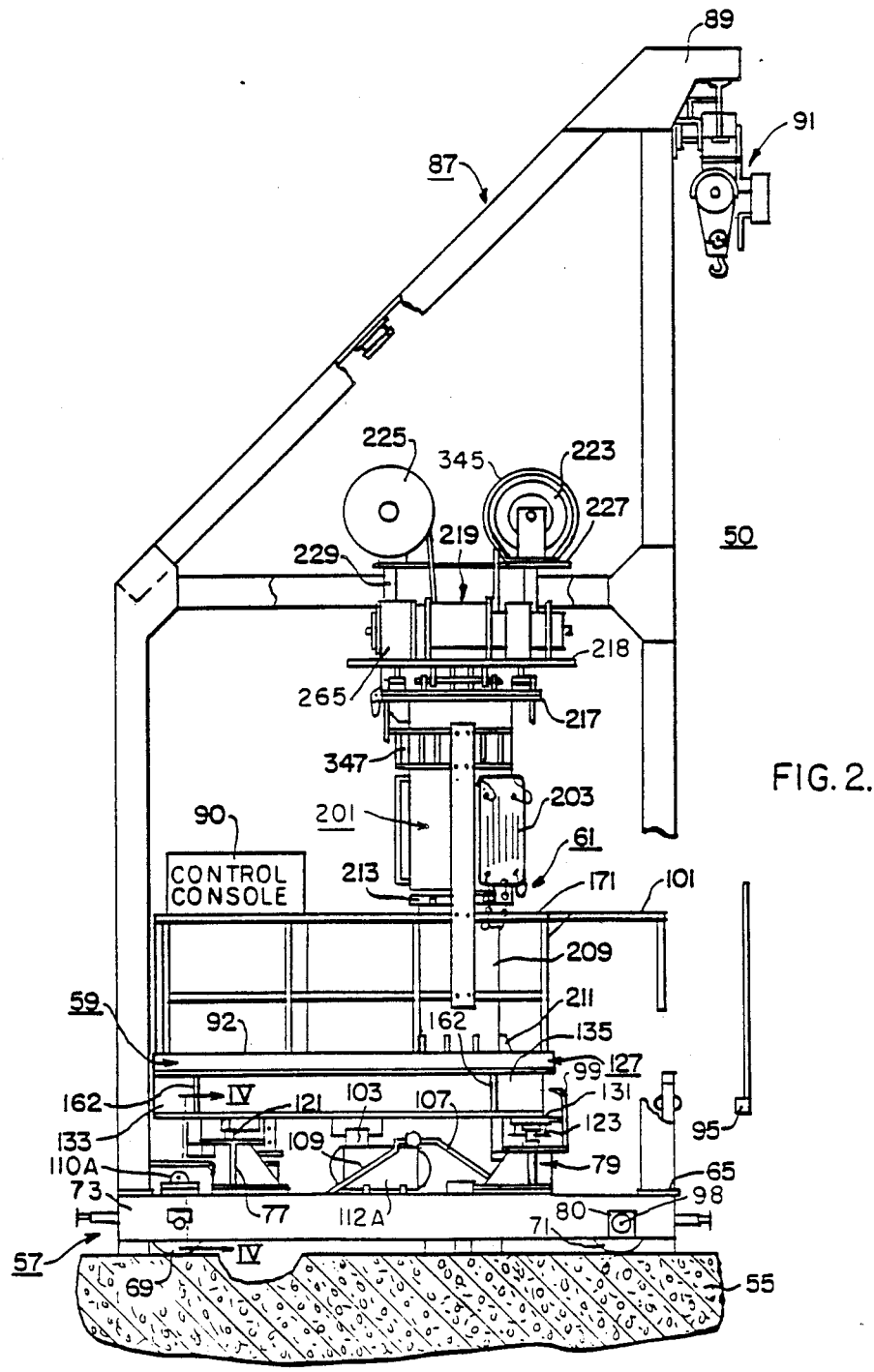
FIG. 2 is a view in end elevation in the direction of the arrows II—II of FIG. 1.
Figure 3:
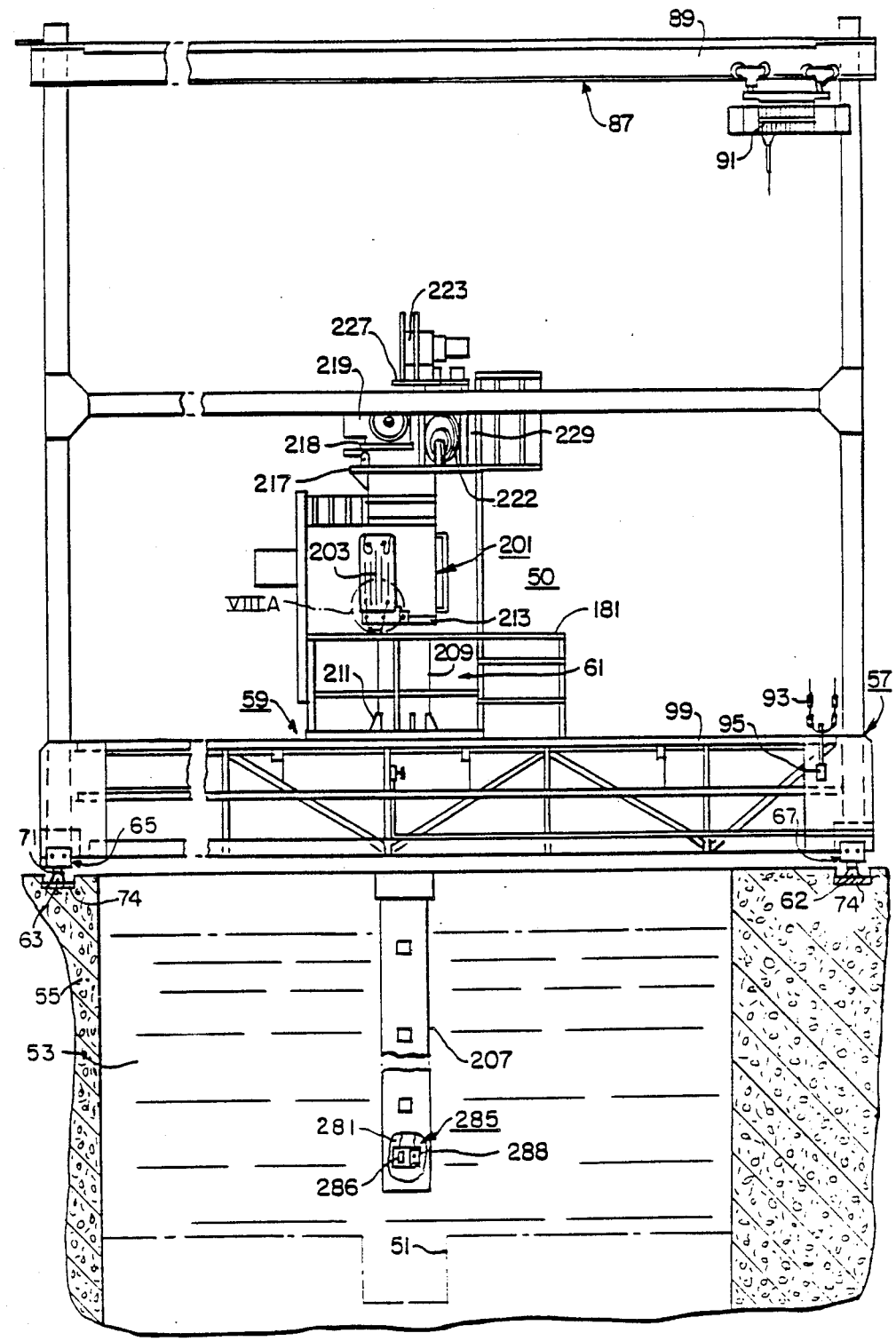
FIG. 3 is a view in side elevation in the direction of the arrows III—III of FIG. 1.

The apparatus 50 includes a bridge 57, a trolley 59 and a mast assembly 61 (FIGS. 1, 2, 3). The bridge is moveable on rails or tracks 62 and 63 (FIGS. 1, 3) The tracks 62 and 63 are supported on base plates 74 in slots on the tops of opposite walls 55 (FIG. 3). Normally the slots are filled with grout.

Figure 4:
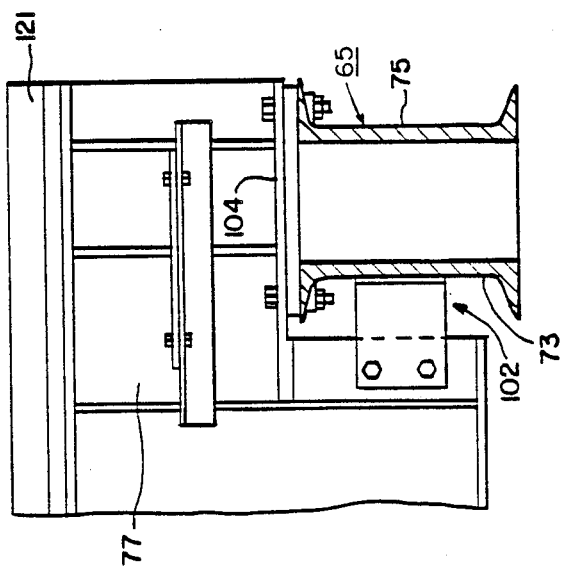
FIG. 4 is a fragmental view in section taken along line IV—IV of FIG. 2 showing the manner in which the channels which form a truck of the bridge support the I-beams of the bridge.

The bridge 57 includes trucks 65 and 67 (FIG. 3). Each truck has a driven wheel 69 and an idler wheel 71 (FIG. 2) on shafts extending between back-to-back channels 73 and 75 (FIG. 4). I-beams 77 and 79 interconnect the trucks 65 and 67. I-beam 77 is adjacent the driven wheels 69. The channels 73 and 75 extend through cut-outs 102 of each beam 77 and 79. Plates 104 welded to the webs of the I-beam are bolted to the upper flanges of the channel. FIG. 4 shows this structure for I-beam 77.

Figure 5:
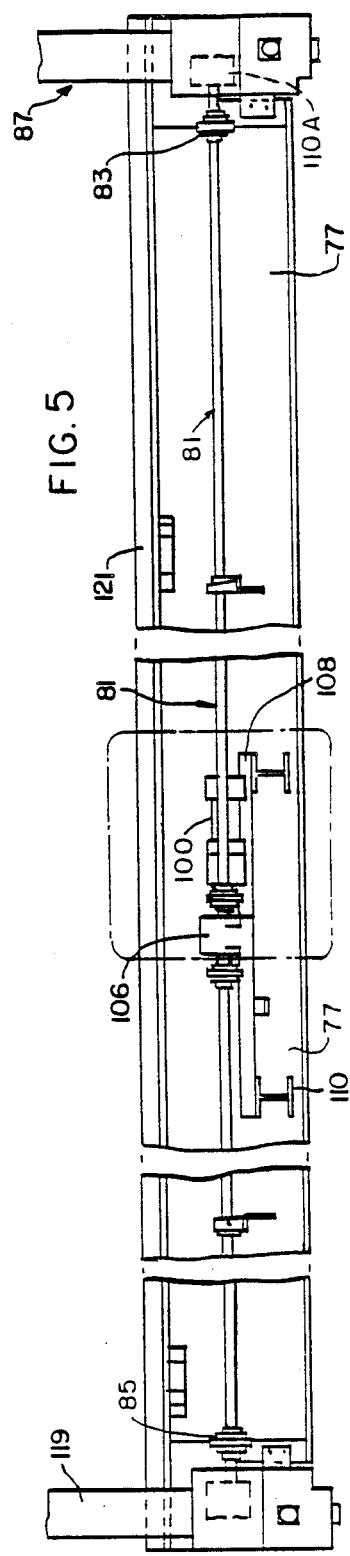
FIG. 5 is a view in side elevation showing the manner in which the I-beam of the bridge supports the motor which drives the driven wheels.

The wheels 69 are driven by motor 100 through speed reducer 106 (FIG. 5). The motor 100 and speed reducer 106 are mounted on a bracket 108 welded to the web of I-beam 77 and supported on small I-beams 110 welded to I-beam 77.

The motor 100 drives shaft 81 (FIG. 1) whose sections are connected through couplings 83 and 85 to pinions (110A). Each pinion engages a gear 112 (FIG. 1) on driven wheel 69. Wheels 69 are rotatable on sleeve bearings (not shown) on their shafts. Wheels 71 are secured to their shafts 98. The shafts 98 are rotatable on bearing cartridges 80 (FIG. 2) which are journaled in the channels 73 and 75.

A frame-like super structure 87 (FIG. 2) is bolted to the trucks 65 and 67 of the bridge spanning the trucks. The super structure 87 has an overhang 89 at the top which carries a hoist 91 for tools. The hoist 91 may be moved between the opposite walls 55 of the pit by a chain 93 (FIG. 3). It may be operated by a pushbutton switch 95 suspended from the hoist. Power is supplied to the hoist 91 by power track 95. Some of the tools which are used with hoist 91 are operated by compressed air.

The supporting mast 201 has a rectangular flange 217 at the top.

The bridge 57 is provided with a walkway 97 on one side. A safety fence 99 extends along the walkway on the side of the pit. The safety fence 99 has handrails 101 in the center permitting personnel to step safely from the trolley 59 to the walkway.

While the fluid for driving the fluid operable means may be of any type, the fluid typically used in the practice of this invention is compressed air. An assembly including a compressor 103 and a tank 112A and associated switch means and relief valves (FIG. 2, see also FIG. 10) is mounted on truck 65 of the bridge 57 to supply the compressed air. Air m ay be selectively supplied to the tools on hoist 91 through air hose 107 and by air hose 109 to the trolley 59 for the air-operated devices on the mast 61.

The apparatus 50 is supplied with power from a power outlet (not shown) on the containment through a conductor 111 (FIG. 4 parent application). Between the outlet and the bridge 57 the power line includes a plurality of festoon loops (not shown).

Figure 7:
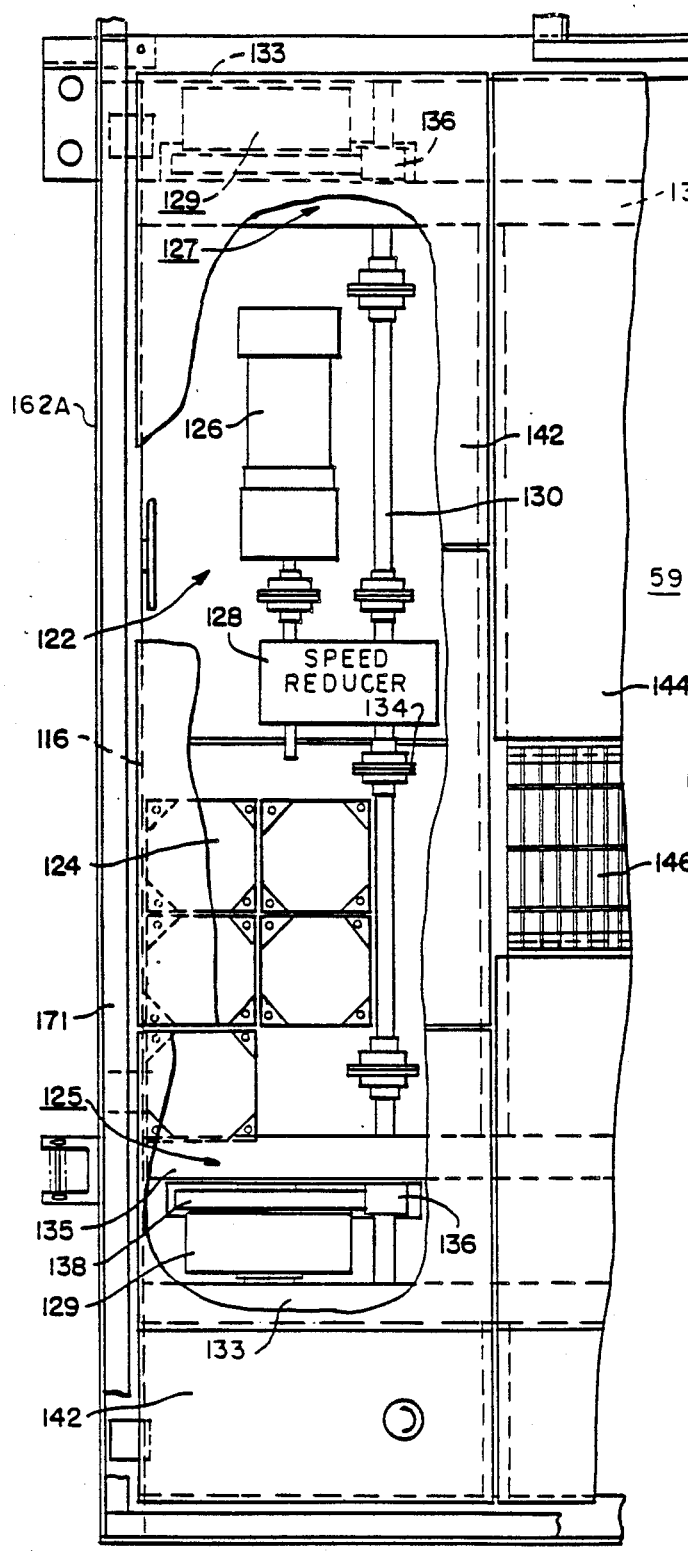
FIG. 7 is a fragmental plan view of the trolley showing the drive for the trolley.

The trolley 59 is moveable on tracks or rails 121 and 123 (FIG. 1) on I-beams 77 and 79. Like the bridge 57 the trolley 59 is moveable along tracks 121 and 123 on trucks 125 and 127 (FIGS. 2, 7). Each truck has a driving wheel 129 (FIG. 7) and an idling wheel (not shown). Each pair of wheels is suspended from back-to-back channels 133 and 135. Each driven wheels 229 is rotatable on sleeve bushings on a shaft supported between a pair of channels 133 or 135, 133 in the outside and 135 on the inside. The channel units 133-135 are strengthened by gussets 162.

Figure 6:
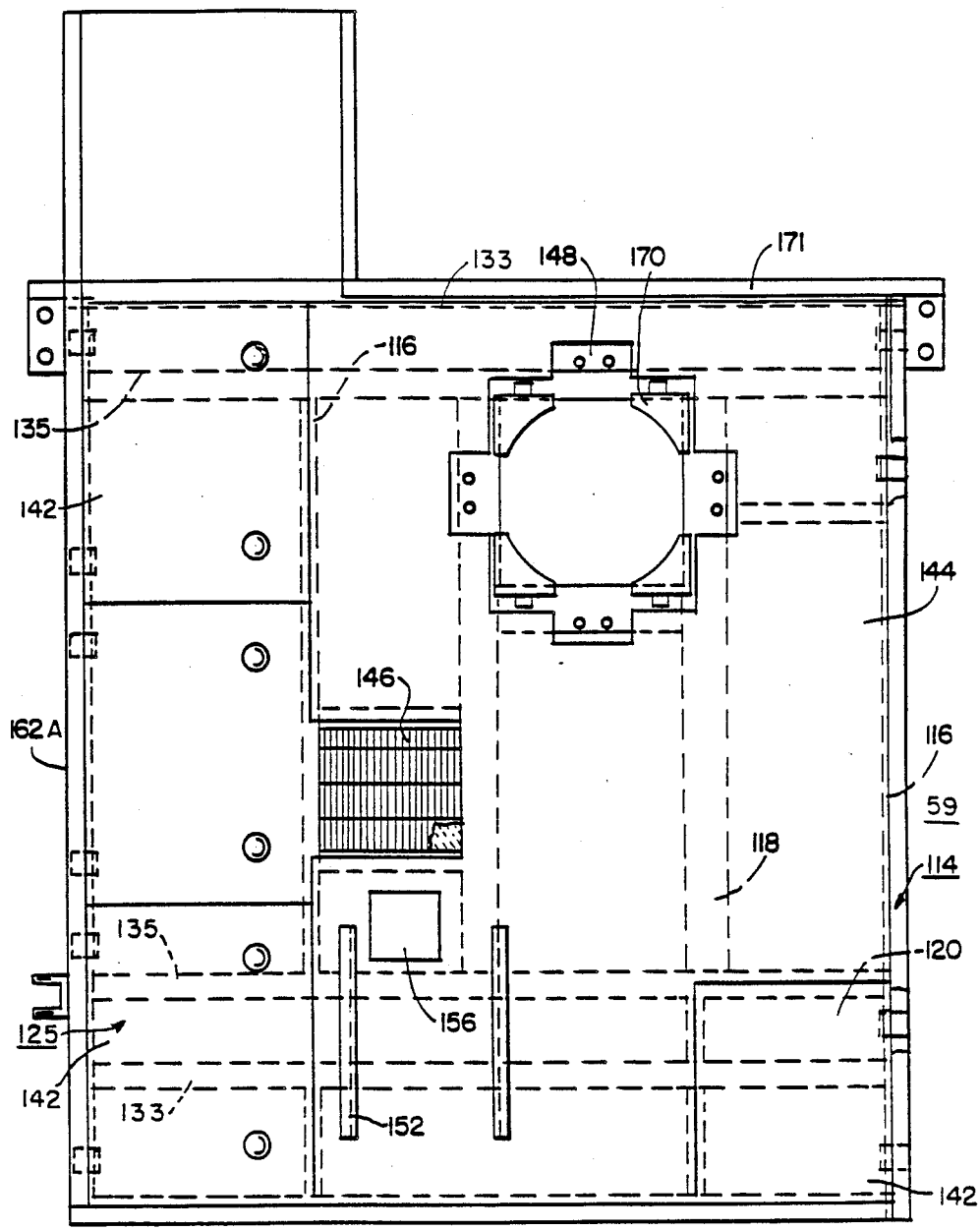
FIG. 6 is a plan view of the trolley with the control console and mast assembly removed.
Figure 27:
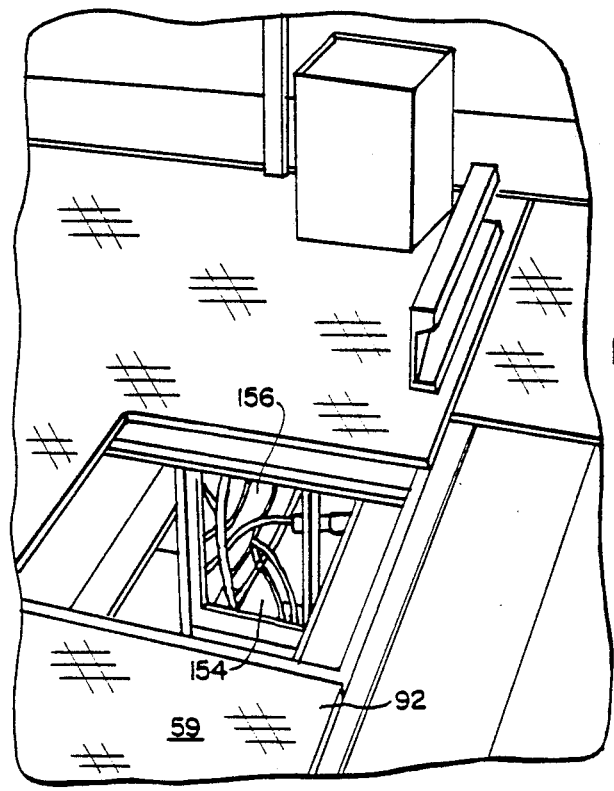
FIG. 27 is a copy of a photograph showing predominantly the junction box in the trolley through which the electrical conductors are connected to the facilities on the trolley, including the control console.
Figure 24:
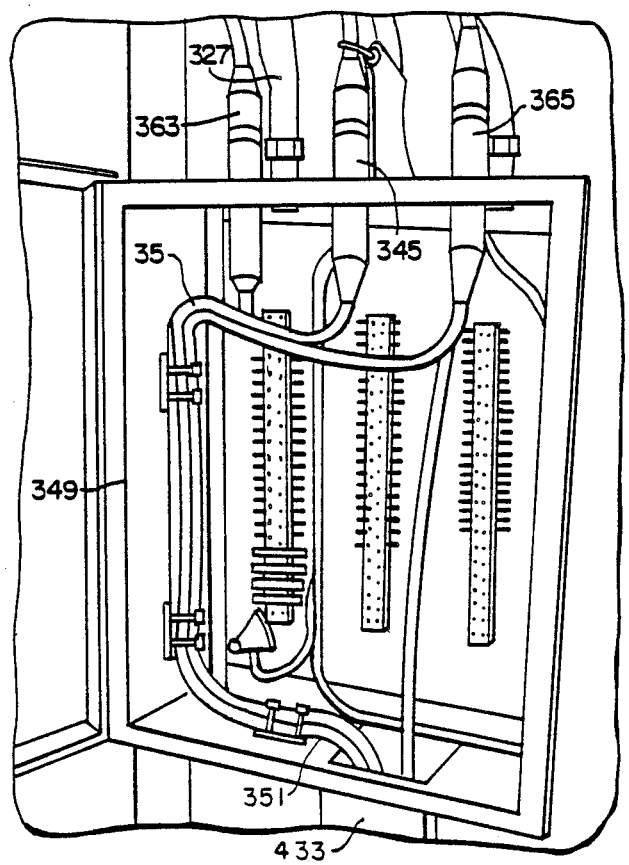
FIG. 24 is a copy of a photograph showing the junction box at the exit of the cable tray and the connections of the cables and electric conductors in this box.

The supporting structures of the trolley 59 is a frame 114 formed of additional channels 116, I-beams 118 and plates 120 (FIG. 6) welded to the channels 133 or 135 of the trucks 125 and 127. A long plate or platform 122 (FIG. 7) is welded to the lower ends of the channels 133, 135, and 116 along the side 162A of the trolley 59 from which the driving wheels 129 are suspended. This plate carries the drive for the wheels 129 including a transformer 124, a motor 126 and speed reducer 128. The drive shaft 130 formed of sections connected by couplers 134 extends from the speed reducer 128. At its ends the drive shaft 130 is connected to pinions 136 which drive gears 138 connected to the wheels 129. The motor is controlled from the computer (not shown) and feeds back its direction of rotation to the computer. At the top the frame 114 is covered by doors 142 and removeable plates 144 which form the deck 92. The deck is provided with a grating 146 through which the pit under the trolley 59 may be viewed. The deck also has pads 148 (FIG. 6) for supporting the mast assembly 60. Doors 170 are interposed between the pads 148. The doors 170 cover triangular holes along the periphery of the mast. The doors 170 are removed when the mast is to be removed. There are also supports 152 for the control console 90. There is an electrical junction box 154 (FIG. 27) under the trolley which is accessible through a hole in the deck 92 by removing grating 146. A handrail 171 extends around the trolley deck 92 (FIG. 1).

Figure 9:
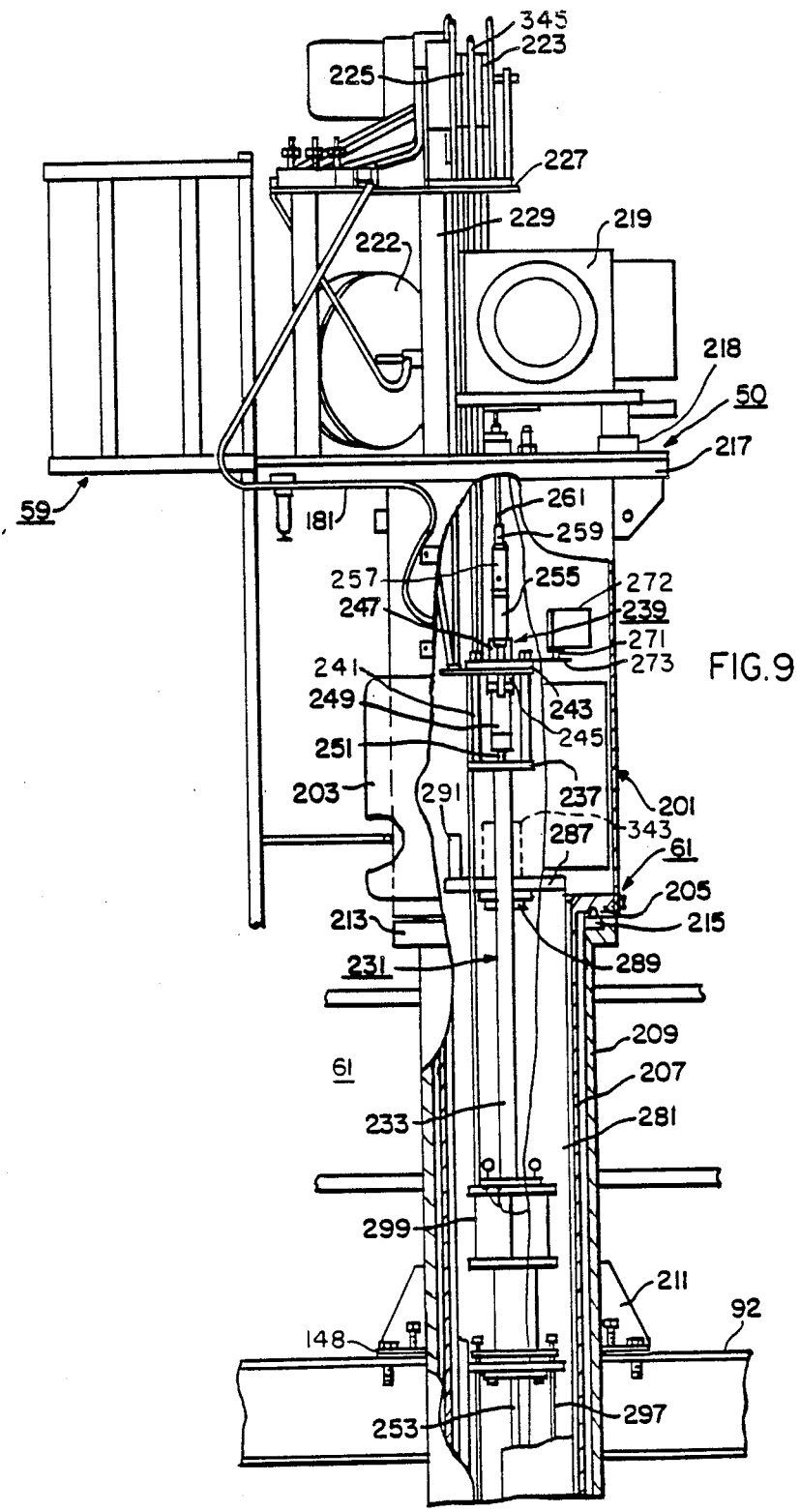
FIG. 9 is a view in side elevation with parts broken away and parts sectioned of the upper part of the mast assembly of apparatus in accordance with this invention.
Figure 16:
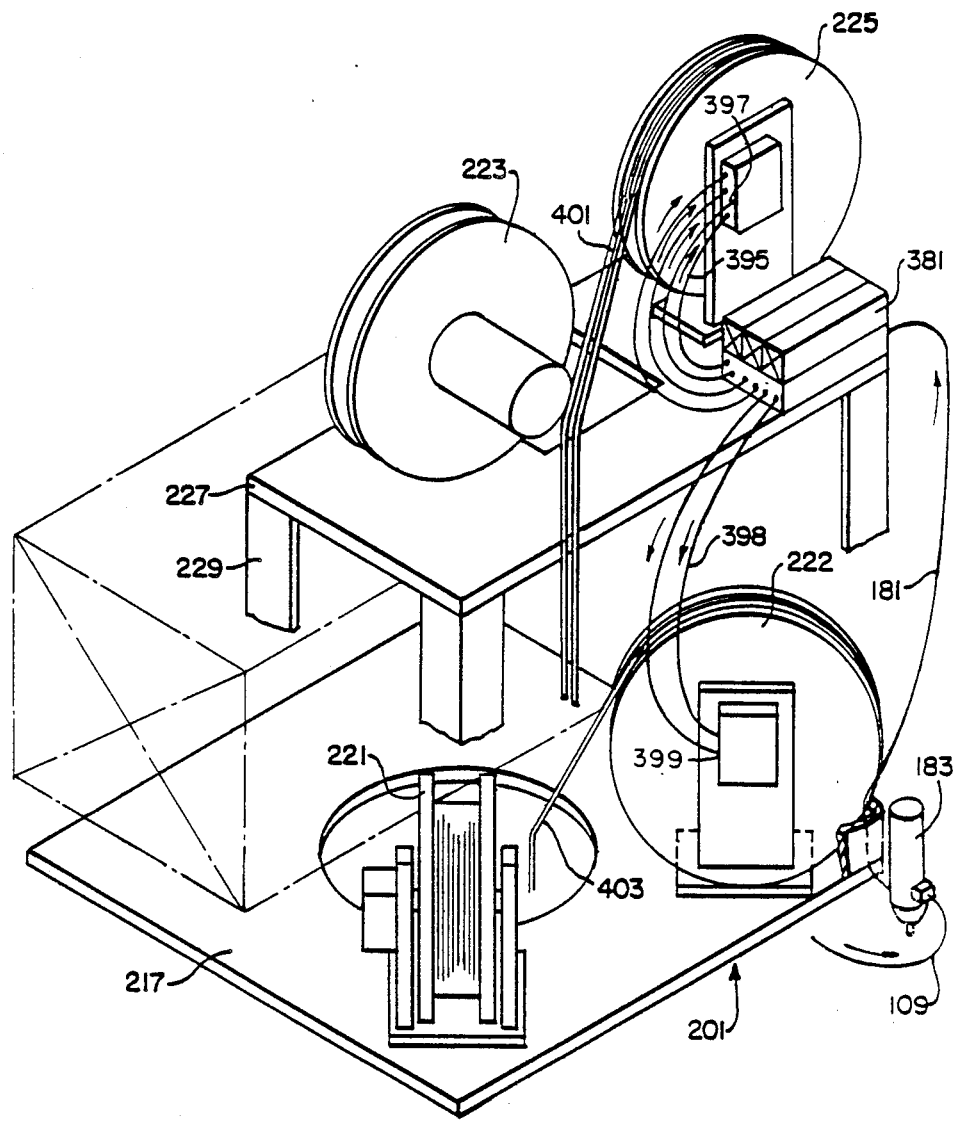
FIG. 16 is a view in isometric, generally diagrammatic, of the fluid and electric conductor reels as seen from the rear of the apparatus with reference to FIG. 2.
Figure 17:
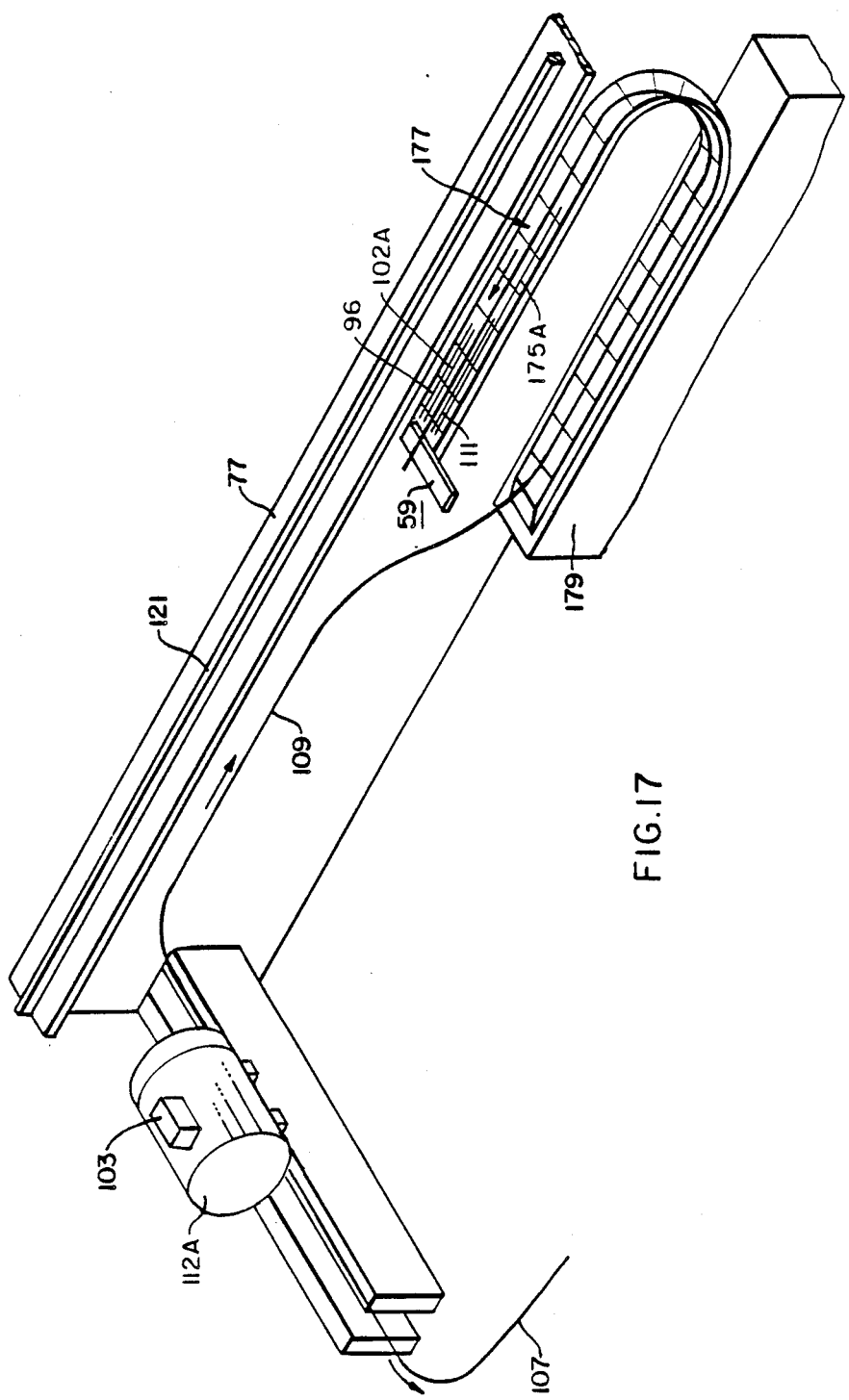
FIG. 17 is a view in isometric, generally diagrammatic, showing the path followed by the fluid conductor between the bridge and the trolley.
Figure 18:
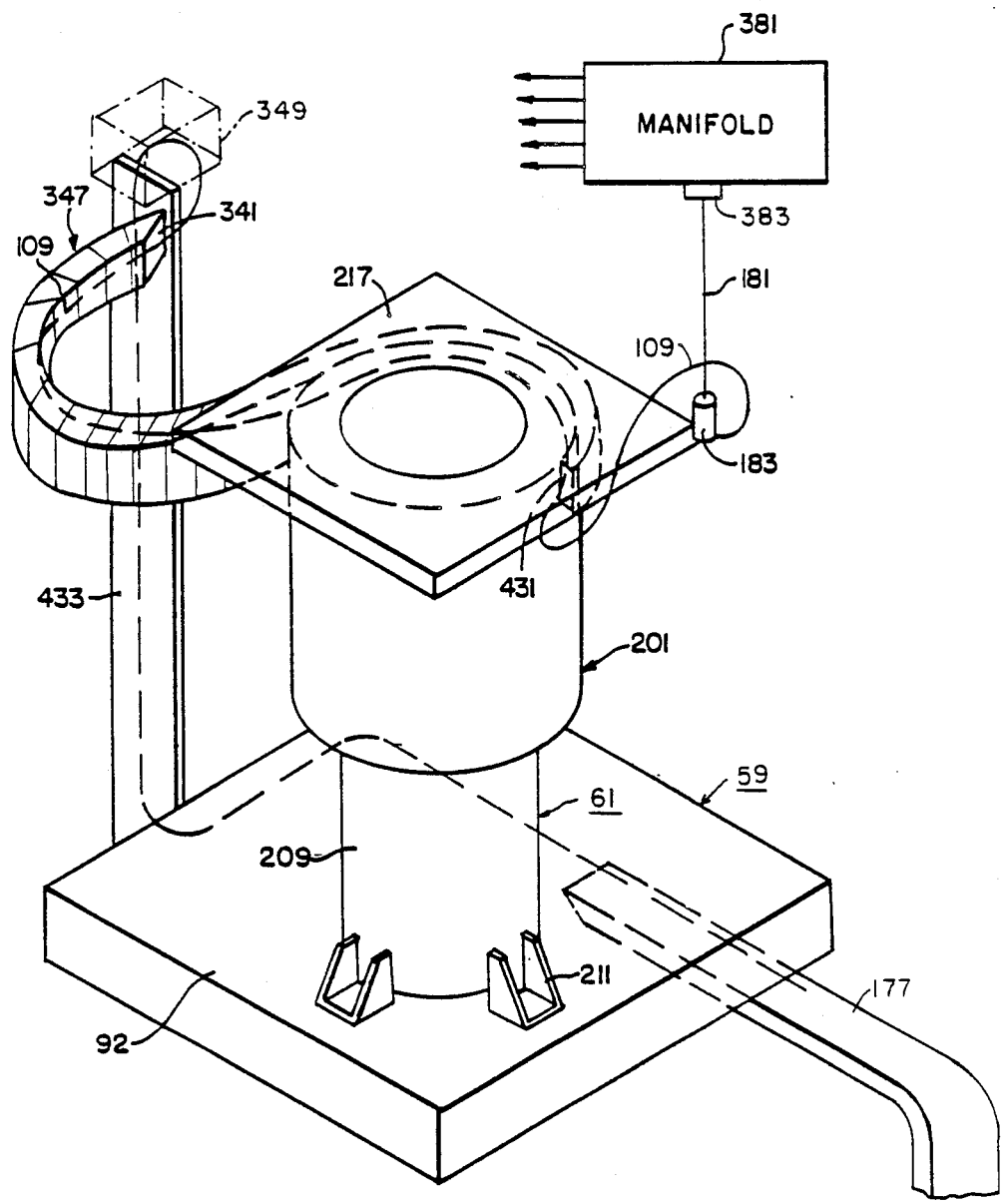
FIG. 18 is a view in isometric, generally diagrammatic showing the path followed by the fluid conductor between the trolley and the mast.
Figure 19:
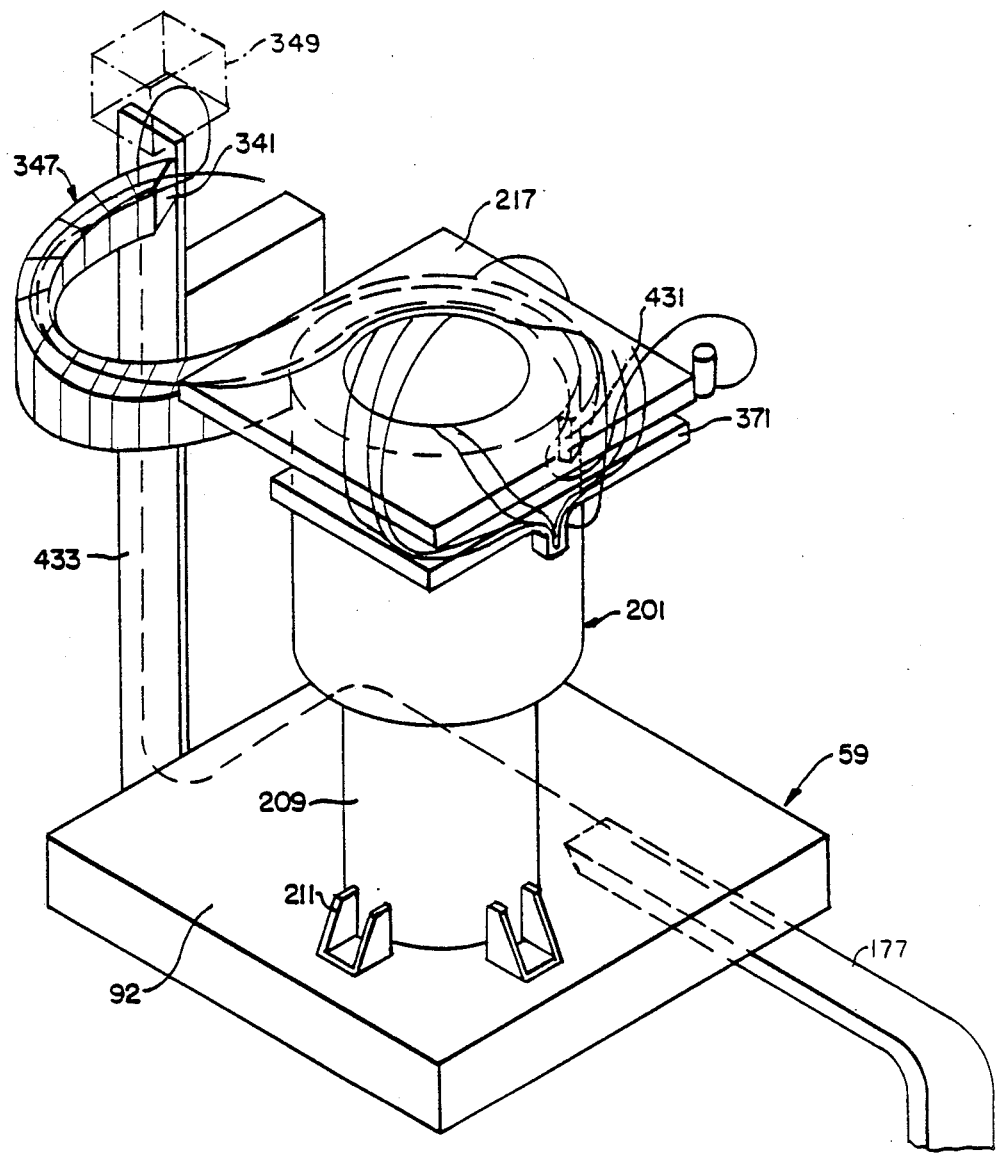
FIG. 19 is a like view in isometric, generally diagrammatic, showing the path followed by the electric conductors between the cable tray and the mast assembly.

A cable tray 177 (FIGS. 8, 17) is connected at one end to a plate 179 suspended from I-beam 77 and at the other end to the underside of trolley 59. The slot or trough of the cable tray 177, which carries the cables is horizontal. The cable tray carries the compressed-air hose 109, the power conductor (111, FIG. 4 parent), and the conductors from a verification switch (86 FIG. 9 parent) on the bridge 57, a pulser (76 FIG. 4 parent) on the non-driven wheel 71, and the television camera (not shown). The cable tray 177 permits the bridge 57 and trolley 59 to travel relative to each other without disturbing the cables on the trolley side. Except for the compressed-air hose 109, the conductors on cable tray 177 are connected to the junction box 154 (FIG. 27) under the bridge and thence are connected to the console 90. The hose 109 is connected to the hose 181 on the mast assembly 61 through pressure regulator 183 (FIGS. 16-18). Conductors powered by the power line also are connected from the junction box 154 to facilities on the mast assembly.

The mast assembly 61 is described in Swidwa. For any information in addition to that presented here that may be of interest, reference is made to Swidwa.

The mast assembly 61 includes a supporting mast 201 (FIGS. 2, 3, 9) of circular cross-section. The supporting mast 201 also has windows 203 (FIGS. 2, 9) through which the operation of the parts within the mast 201 may be observed. The supporting mast 201 is secured to ring 205 (FIGS. 8b, 9) from which a long guiding mast 207 of circular section extends. The apparatus also includes an auxiliary mast or bearing mast 209. Brackets 211 extend from the auxiliary mast 209 near its lower end. These brackets engage the bracket pads 148 (FIG. 6) on the deck 92 of the trolley 57. The auxiliary mast 209 has a flange 213 at the top which carries a thrust-bearing ring 215. The ring 205 has a seat for the bearing ring 215. Supporting mast 201 and the ring 205 and guiding mast 207 and other parts supported from the supporting mast are rotatable on the bearings 215.

There are supported directly on flange 217 a platform 218, on which a winch 219 (FIGS. 2, 9, 16) is mounted. An electric conductor reel 221 (FIG. 16) and an airhose reel 222 are also mounted on platform 218. An additional reel 223 for electric conductors and an additional air-hose reel 225 are supported from a platform 227 mounted on legs 229 on flange 217 (FIG. 16). An elongated member 231 (FIG. 9) having at its lower end, grapples (not shown) for engaging a control-rod cluster (not shown) or a thimble-plug cluster (not shown) of the reactor 51 to be refueled, are moveable upwardly or downwardly by the winch 219. The elongated member 231 includes a tube 233 (FIG. 9) to the upper end of which a plate 237 is secured. The plate 237 is formed into a rigid mechanical unit with an upper-plate assembly 239 by four support rods 241. The rods 241 engage plate 237, and are secured by nuts to the plate 243 of the upper-plate assembly. The flange 245 of a yoke 247 engages the plate 243 and carries a cylinder 249, typically an air cylinder at its other end. The flange 245, plate 237 and cylinder 249 are connected together as a rigid unit. The piston rod 251 of cylinder 249 actuates a rod 253 to move upwardly or downwardly in the tube 233. When actuated to its utmost down position, the rod 253 causes the grapple (not shown) to engage the control rod assembly or thimble-plug assembly which is to be raised. In the up position of the rod 253, the grapple may be disengaged from the component assembly. Limit switches 254 and 256 (FIG. 10) are provided for signaling that the piston rod 251 is at its extreme psotions. The yoke 247 is pivotally connected to the lower junction of swivels 255. The upper junction of each swivel 255 is pivotally connected to a clevis 257. The clevis 257 is suspended from a threaded member 259 at the end of a cable 261 from the winch 219.

The mast assembly also includes an inner mast or gripper mast 281. This mast 281 is of generally rectangular cross section composed of oppositely disposed channels formed into a rigid unit by cross snow-flake plates, as shown in detail in Swidwa. The inner mast carries a gripper 285 (FIG. 3), for engaging a fuel assembly (not shown). The top plate 287 of the inner mast 281 has an opening which may be constricted by a yoke 289 pivotally suspended from plate 287. A yoke 289 is moveable by an air cylinder 291 (FIGS. 9, 10) on plate 287 from a closed position, in which it constricts the opening, to an open position in which it does not constrict the opening. The tube 233 of the elongated member 231 carries lugs (not shown). The lugs can pass through the opening with the yoke 289 in open position and engage the yoke 289 when it is in the closed position. With the yoke in the open position, the elongated member 231 alone is moveable upwardly by the winch 219. This occurs when only a control assembly or thimble-plug assembly is to be raised. With the yoke closed, the inner mast can rest on the lugs or can be raised when the elongated member 231 is raised by the winch. The latter event occurs when a fuel assembly is to be raised. Limit switches 293 and 295 (FIG. 10) are provided for cylinder 291 to signal the extreme positions of this cylinder.

Figure 10:
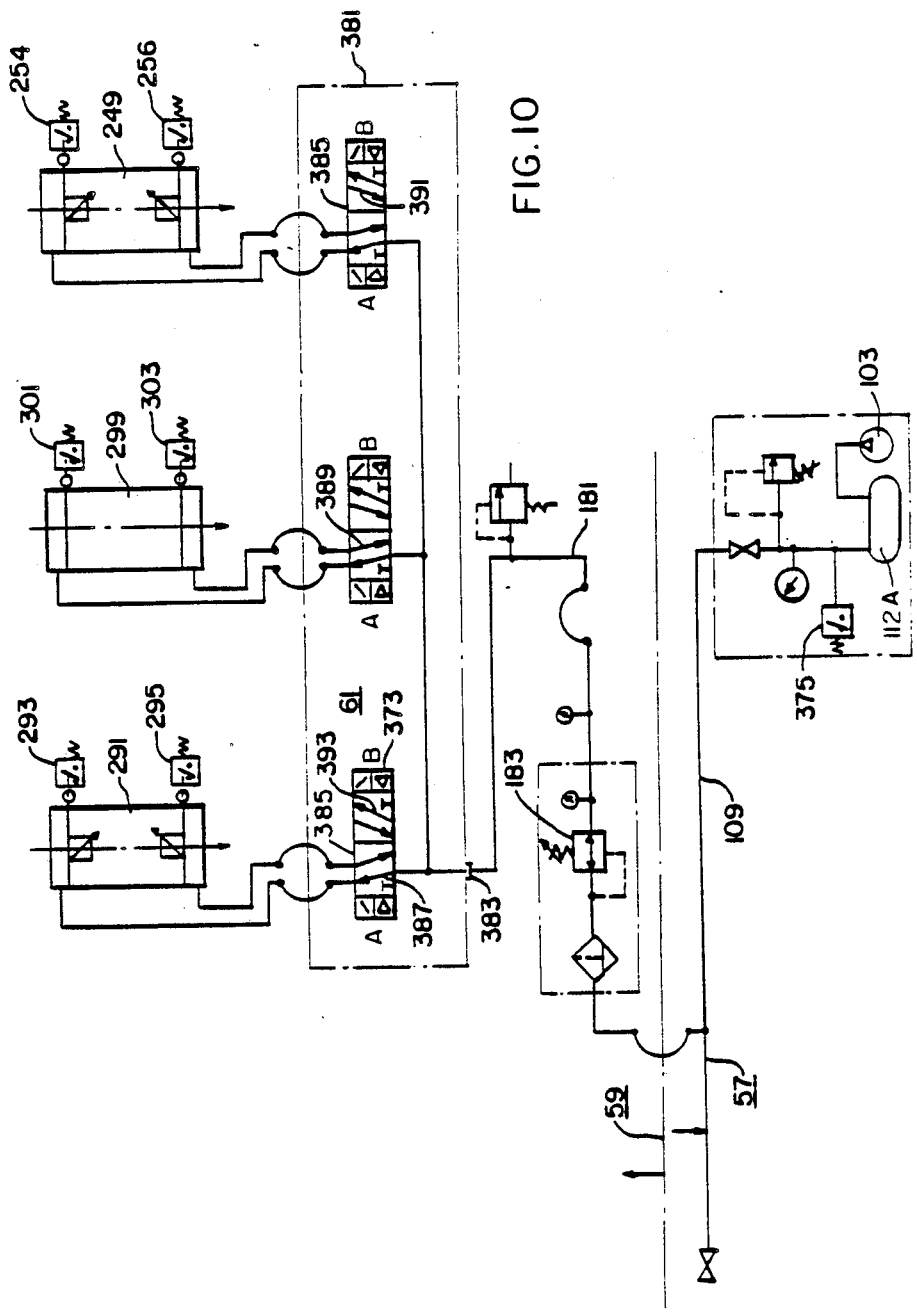
FIG. 10 is a schematic of the pressure fluid systems for operating the pistons which control the component-assembly handling mechanism of this invention.

The gripper assembly 285 (FIG. 3) is actuable to engage or disengage a fuel assembly by rods 297. The rods 297 are movable upwardly and downwardly by a hollow cylinder 299 (FIGS. 9, 10) through which the tube 233 passes. The extreme positions of the cylinder 299 are signalled by limit switches 301 and 303 (FIG. 10).

The supporting mast 201 may be locked in an initial position by a locking screw 311 (FIGS. 8A, 8B) operated by knob 313. The screw 311 and knob 313 are suspended from bracket 315 secured to the mast 201. When the knob 313 is turned the screw tip 317 penetrates into a hole in the flange 213 of the auxiliary mast 209. In the initial position of the supporting mast 201, the plunger 317 of a limit switch 319, supported from a bracket 321 in mast 201, is held in a predetermined setting by a cam 323 in the flange 213. When the mast 201 is rotated, this switch 319 is actuated.

Figure 11:
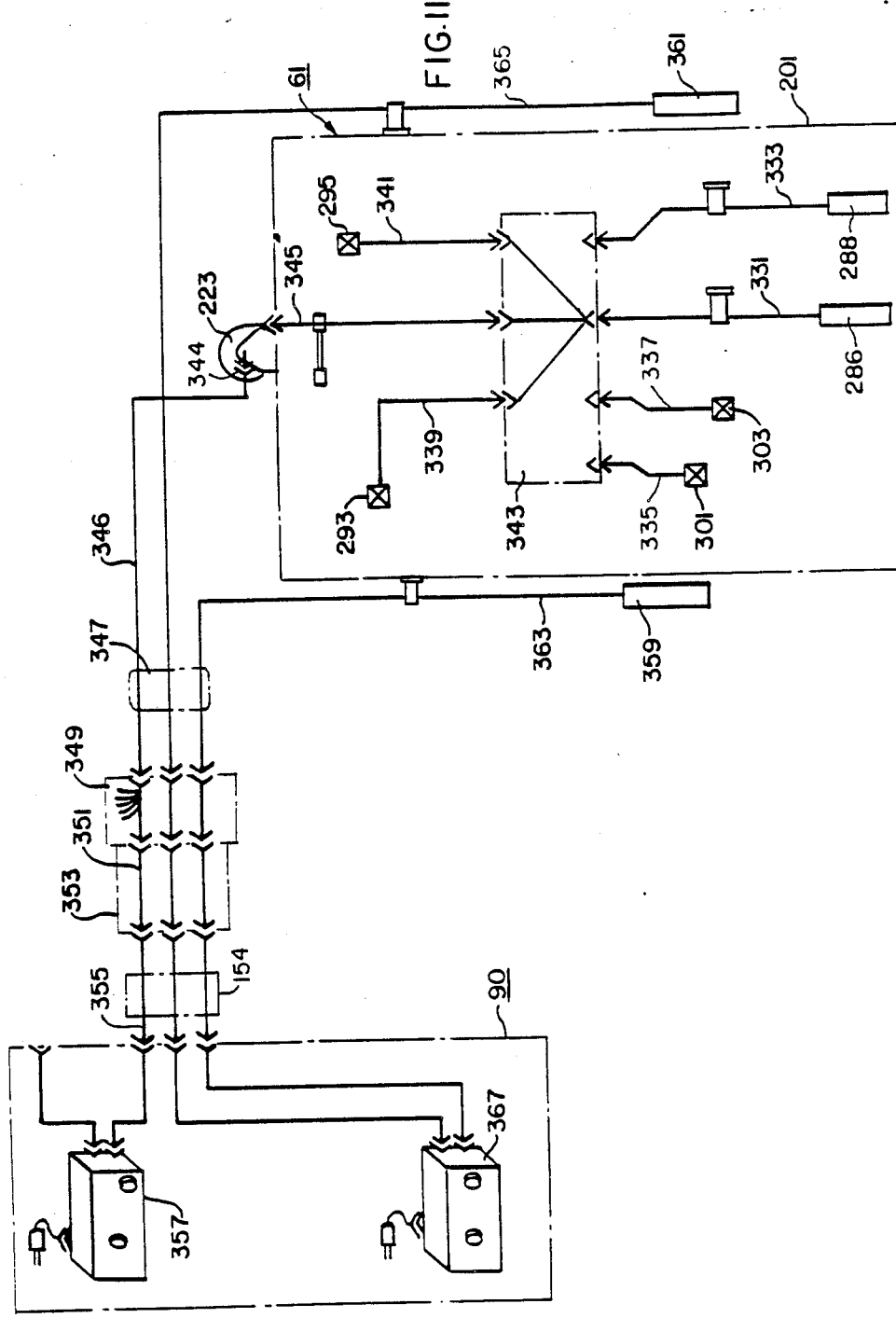
FIG. 11 is a schematic of the electrical system of the component-assembly handling mechanism of this invention.
Figure 12:
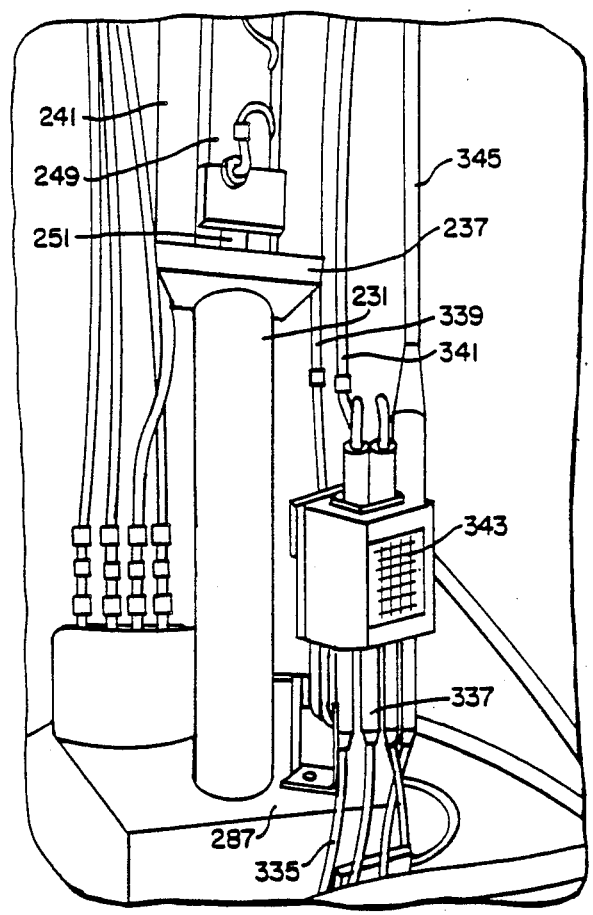
FIG. 12 is a copy of a photograph showing the manner in which the conductors on the component-assembly handling mechanisms are mechanically related to these mechanisms.
Figure 21:
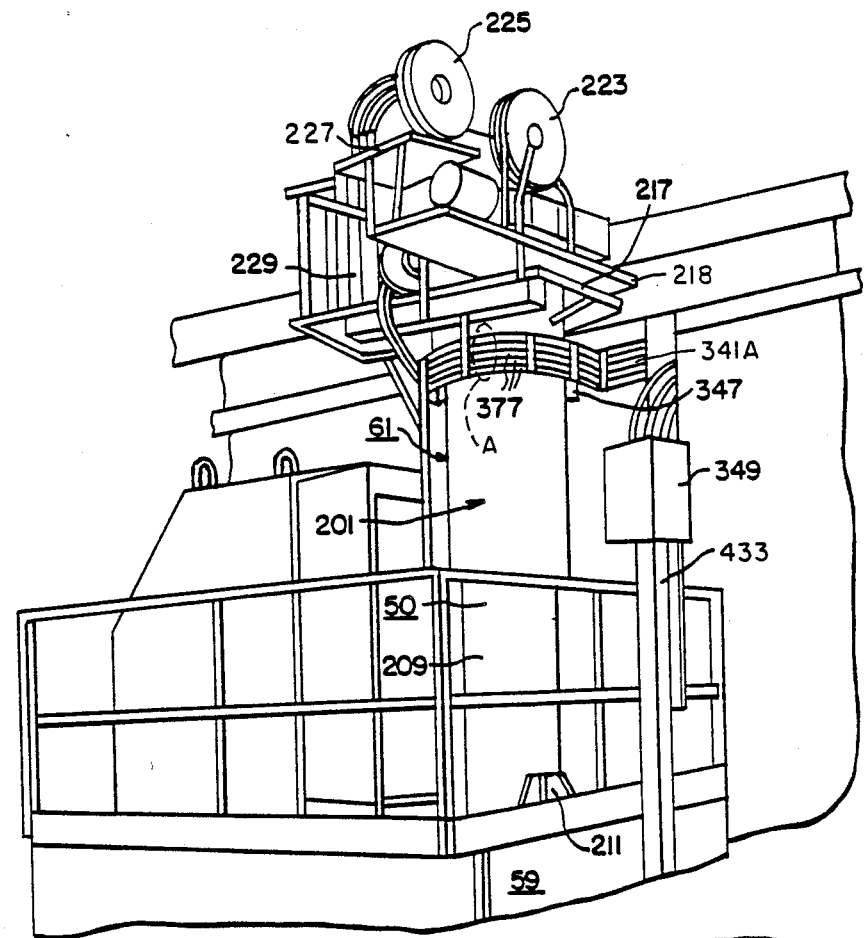
FIG. 21 is a copy of a photograph of apart of the appaatus according to this invention showing predominantly the cable tray and its relationship to the mast and the reels for the electrical and fluid conductors.
Figure 21A:
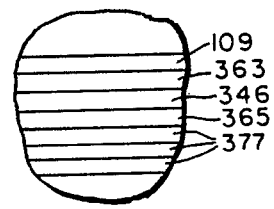
FIG. 21A is a view enlarged of the area of FIG. 21 in the circle A.
Figure 20:
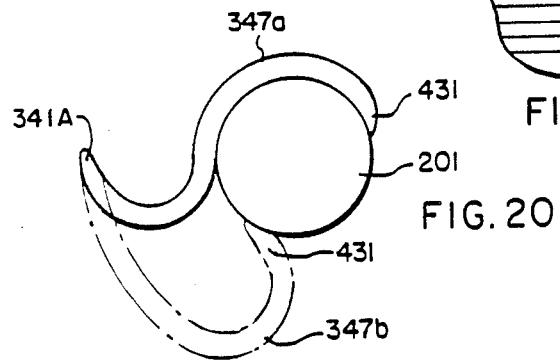
FIG. 20 is a diagram showing the manner in which the cable tray is wound on, and unwound from, the supporting mast.
Figure 22:
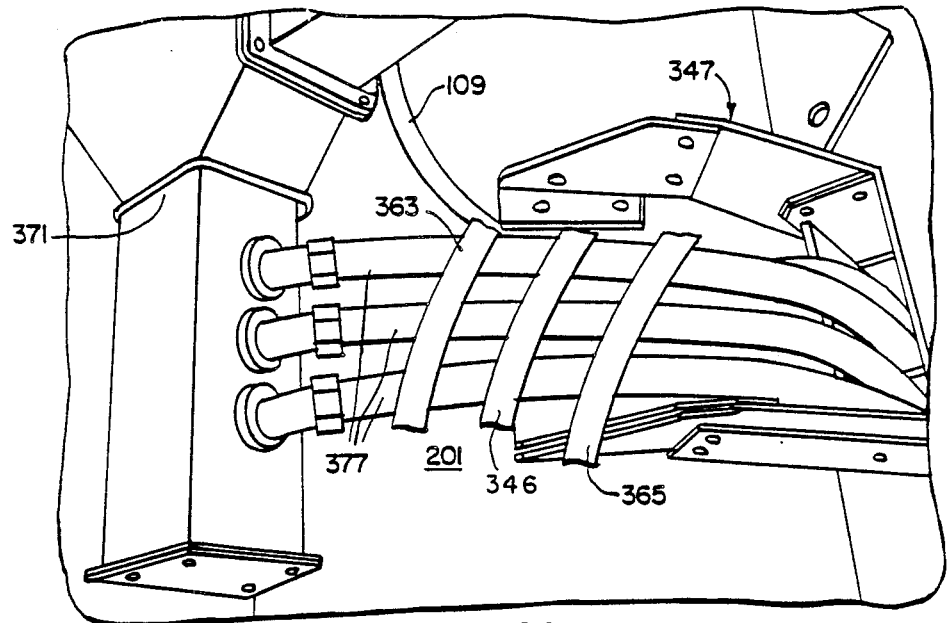
FIG. 22 is a copy of a photograph showing the manner in which the fluid and electric conductors enter the cable tray at the end where it is connected to the supporting mast.

The disposition of electrical conductors on the mast assembly 61 in the practice of this invention will now be discussed with reference to FIG. 11. The heavy black lines in FIG. 11 each represents a cable or harness including a number of wires. The following cables are connected to parts which are moveable up or down with the elongated member 231 or the inner mast 281:

The cable 331 from the television camera 286 (FIG. 3);

The cable 333 from the light source 288;

The cable 335 from the limit switch 301 associated with the gripper cylinder 299;

The cable 337 from the limit switch 303;

The cable 339 from the limit switch 293 associated with cylinder 291 for the yoke;

The cable 341 from the limit switch 295. These cables 331 through 341 are connected to the input terminals of junction box 343 (FIG. 12) which is mounted on the plate 287 of the inner mast 281. The output cable or harness 345 from box 343 which includes conductors carrying the current of all input conductors is wound on cable reel 223. The conductors are connected through a slip ring system 344 (FIG. 1) to cable section 346. Cable section 346 passes through an additional cable tray 347 (FIG. 22) to junction box 349. Cable section 351 from the junction box 349 passes through wire way 353 to the junction box 154 (FIGS. 21, 27) under the deck 92 of the trolley 59. Cable section 355 from this junction box 154 is connected to a rack 357 in the control console 90. Television cameras 359 and 361 are mounted on guiding mast 209. Since this mast is not moveable, cables 363 and 365 for these cameras are connected directly, and not through a reel, to a rack 367 of console 90 through cable tray 347, junction box 349, wire way 353 and intermediate cable sections.

Figure 23:
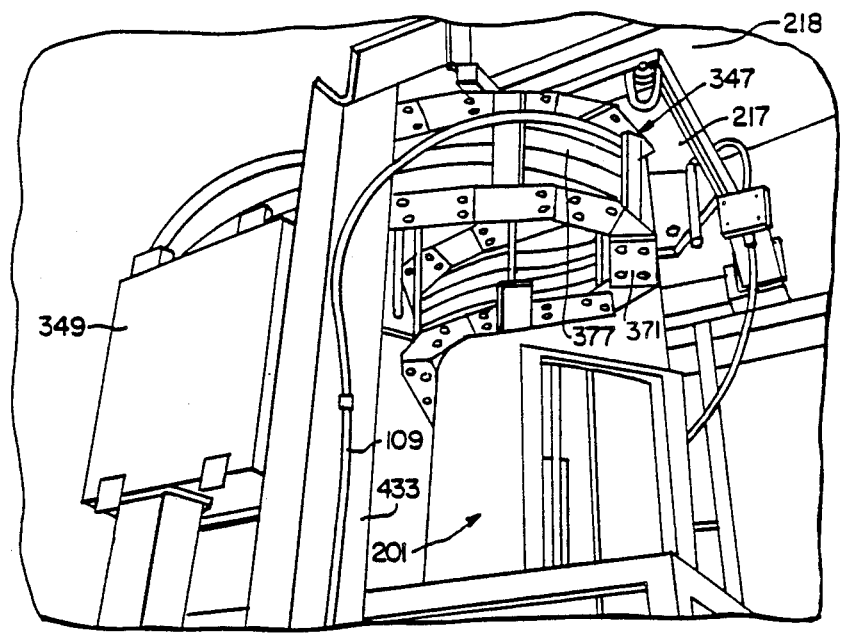
FIG. 23 is a copy of a photograph showing the manner in which the fluid and electric conductors leave the cable tray.

The cable from limit switches 254 and 256 (FIG. 10) for the cylinder 249 which controls the movement of the elongated mast 231 is wound on reel 221 (FIG. 16). The cable from the slip ring (not shown) of this reel 221 and the conductors from the following components are passed in conduits 377 through a Y wireway 371 (FIGS. 22, 23) whence they pass through cable tray 347.

The conductors from the solenoids 373 (FIGS. 10, 26) for the valves which control the flow of compressed air to the cylinders 249, 291, 299 (FIG. 10).

The conductors from pulser (FIG. 6 parent) 263 measuring the height of the elongated member 231.

The conductors from limit switch 271 (FIG. 9) which verifies the calibration of the height of the elongated member:

The conductors from winch motor 265 (FIG. 1);

The conductors from pressure switches 375 (FIG. 10) on the compressed air line 109;

The conductors from limit switch 319 (FIGS. 8a, 8B) signalling displacement of supporting mast 201 from its initial position.

These conductors are combined in conduits 377 The conductors from limit the Y wire way 371. The conduits pass through the cable tray 347 to the junction box 349 where they are connected to conductors which pass through wire way 353 and to junction box 154. At this junction box 154 the conductors are appropriately connected to the console.

The conductors from the pulsers (76 FIG. 4 parent) on the bridge 57 and (143 FIG. 5 parent) on the trolley 59 are connected directly to the junction box 154 and thence to the control console 90. The verification limit switches (86 FIG. 9 parent) operated by the bridge and (155 FIG. 10 parent) operated by the trolley are likewise connected to the control console through junction box 154.

Figure 26:
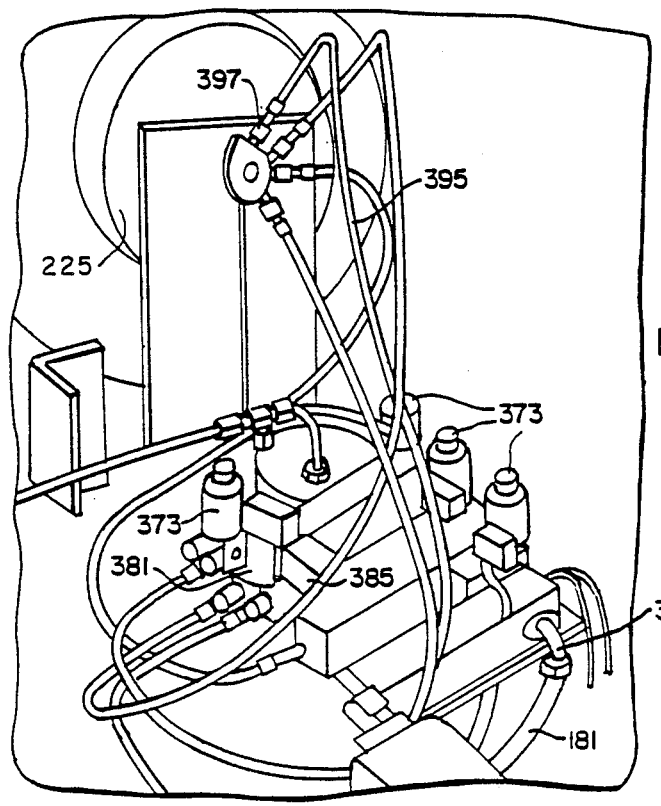
FIG. 26 (sheet 18) is a copy of a photograph showing the manner in which fluid from the fluid conductor is distributed for flow to the cylinder controlling the component-assembly handling mechanism.

The compressed air is distributed to the cylinders 249, 291, 299 through a manifold 381 (FIGS. 10, 18, 26). The hose 181 is connected to the input 383 of the manifold. The outputs of the manifold are delivered through valves 385 (FIGS. 10, 26), each of which is actuable by a solenoid 373. The valves 385 remain in the last position to which they are actuated. If solenoid A (FIG. 10) is last actuated, the flow is as shown in FIG. 10 into the upper terminal of a cylinder and out at the lower termainal as represented by arrows 387 and 389. If solenoid B is last actuated, the flow is into the lower terminal and out of the upper terminal as represented by the arrows 391 and 393. Four of the output hoses 395 from the manifold 381 are connected to inputs 397 of the upper hose reel 225 (FIGS. 16, 26). Two of the output hoses 398 are connected to the inputs 399 of the lower reel 222. The hoses 401 extending from the peripheral output of reel 225 supply compressed air selectively to the cylinder 299 for operating the grippers and to the cylinder 291 for operating the yoke 289 on the inner mast 281. The two peripheral hoses 403 from reel 222 supply compressed air selectively to operate the cylinder 249 for moving the rod 253 in tube 233.

The reels are procured from Aero Motive Manufacturing Co. of Kalamazoo, Mich. Typical reels 221 and 223 for electrical conductors are identified as Catalogue No. 56269-147. Typical air hose reels are identified as Catalogue No. D70A-40. The hoist 219 and the reels 221, 222, 223, 225 which carry the electrical and fluid conductors are mounted on the supporting mast and are rotatable with the mast and the operable driven parts supported on the mast to which the cables from these reels are connected. Loops in the cable to provide for relative rotation between the reels and the driven parts are dispensed with and interference of the conductors with the cables from the hoist is precluded.

Figure 25:
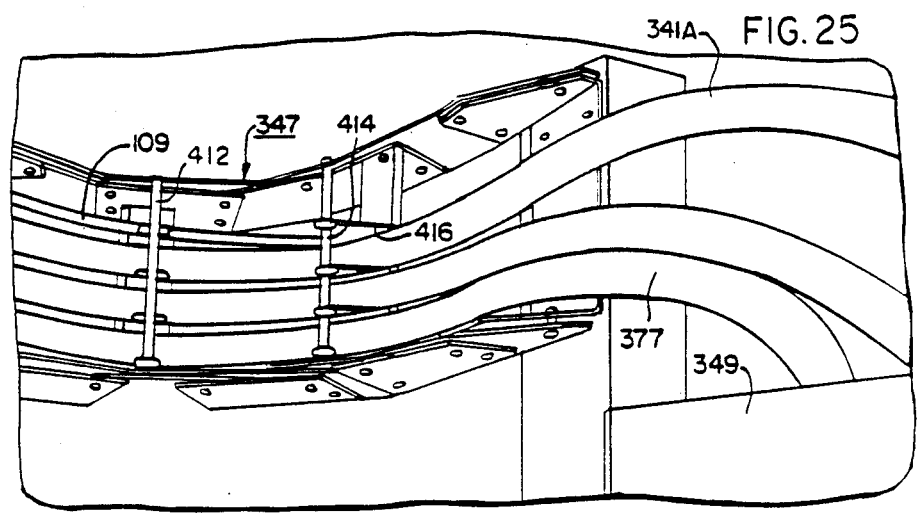
FIG. 25 (sheet 11) is a copy of a photograph showing the end of the cable tray remote from the supporting mast and the conduits passing through the cable tray.

A typical cable tray 347 is shown in FIGS. 13, 14, 15. The tray is composed of oppositely disposed pairs of plates 411 jointed by cross bars 412 (FIG. 25). The plates on each side engage in slots 415 and 417 in pivot plates 419 and 421. The slots 415 for pivots 1 through 6 are shorter than the slots 417 for pivots 7 through 12. Between the plates a slot is formed for containing cables, conductors or conduits. Opposite the bars 412 there are rods 414 (FIG. 25) from which plates 416 for separating cables or conduits extend inwardly towards the bars 412. The plates 411 and the bars 412 define slots or troughs through which the cable, hose and conduits extend.

The cable tray 347 is mounted with its slot or trough through which the cable, conduits or hoses extends vertically. At the end 431 where the wires from wire way 371 enter the conduits 377 on the cable tray, the tray is connected to the supporting mast (FIGS. 18, 19, 20, 22). From this end the tray extends part way peripherally around the mast. It then departs from the mast to a position spaced from the mast where the junction box 349 is mounted on a long angle 433 extending from the end of the cable tray to the trolley 59. When the mast 201 is turned in one direction, clockwise with reference to FIG. 20, the cable tray is wound on the mast 201 as shown at 347a. The cable tray then has the configuration of an S. When the mast 201 is turned in the opposite direction, counterclockwise, the cable tray unwinds from the mast as shown at 347b. In either event the cables, conduits and hose at the end 341A of the cable tray are not moved.

The winch 219 and its cables 259, and the reels 221, 222, 223 and 225 and their cables and hoses are mounted on supporting mast 201 and are rotatable with the mast. The cables 259 and hose and electric cables do not become twisted or interfere with each other.

While a preferred embodiment of this invention has been disclosed herein, many modifications thereof are feasible. This invention is not to be limited except insofar as is necessitated by the spirit of the prior art.

We claim:

1. Apparatus for refueling a nuclear reactor, said reactor being disposed in a pit in a containment under water and having component assemblies of at least one type, a trolley, means mounting said trolley moveably on said containment so that it may be set in different positions over the area of said pit, a supporting mast, bearing means on said trolley for supporting said supporting mast rotatably with respect to said trolley, means, suspended in said pit from said supporting mast when said supporting mast is so rotatably supported, for engaging and raising and lowering, said component assemblies of said reactor of at least one type, said engaging-raising-and-lowering means being rotatable with said supporting mast, electrically operable means mounted on said supporting mast and connected to said engaging-raising-and-lowering means, electrical facilities on said trolley, electrical conductors connecting said electrical operable means to said facilities, a flexible cable tray connected to said supporting mast at one end, extending from said one end peripherally at least partly around said mast and thence departing tangentially from said mast and terminating at the opposite end a predetermined distance from said mast so that when said mast is rotated in one direction, said tray is wound peripherally on said mast and when said mast is rotated in the opposite direction, said tray is unwound peripherally from said mast, said conductors, in passing between said electrical operable means and said facilities, extending through said cable tray, entering said tray near said end and leaving said tray near said opposite end, said tray remaining substantially fixed at said opposite end as said tray is wound on and unwound from said mast, whereby said conductors are anchored near said opposite end as said mast is rotated, whereby the portions of said conductors extending away from said tray from said opposite end are not moved as a result of the rotation of said supporting mast.

2. The apparatus of claim 1 wherein the mounting means for the trolley includes a bridge moveably supported on the containment, and wherein the apparatus includes fluid-pressure operable means mounted on the supporting mast, and pressure-fluid supply means mounted on the bridge;

the said apparatus also including a fluid conductor connecting said pressure-fluid-supply means to said fluid-pressure operable means, the said fluid conductor passing from said pressure-fluid-supply means to said fluid-operable means through the cable tray, whereby on rotation of the supporting mast the portions of the conductor between the ends of the cable tray and the pressure-fluid-operable means and the pressure-fluid-supply means are not moved.

3. The apparatus of claim 1 wherein the flexible cable tray has flexible sides, said tray being mounted on the supporting mast so that said flexible sides are aligned generally vertically one above the other.

4. The apparatus of claim 1 wherein the portion of the electrical conductors between the electrical operable means and the cable tray extend from the electrical-operable means and the end of the cable tray where it is connected to the supporting mast and the portions of the conductors between the electrical facilities on the trolley and the cable tray extend from the electrical facilities to the opposite end of the cable tray.

5. The apparatus of claim 1 wherein the flexible cable tray between the position where it is connected to the mast and the position where it terminates a predetermined distance from the mast has generally the shape of an S.

6. The apparatus of claim 2 wherein the portion of the fluid conductor between the pressure-fluid-operable means and the cable tray extend from the pressure-fluid-operable means and the end of the cable tray connected to the mast and the portion of the fluid conductor between the pressure-fluid-supply means and the cable tray extends from the pressure-fluid-supply means to the opposite end of the mast.

7. The apparatus of claim 2 wherein the portion of the fluid-conductor between the bridge and the cable tray is connected to the trolley at a position between the bridge and the cable tray, the said apparatus including an additional cable tray connected at one end to the bridge and at the opposite end to the trolley, the said conductor passing through said additional cable tray, whereby the portion of said conductor between said fluid-supply means and said one end is not moved on movement of said trolley.

8. Apparatus for refueling a nuclear reactor, said reactor being disposed in a pit in a containment under water and having component assemblies of at least one type, a trolley, means mounting said trolley moveable on said containment so that said trolley may be set in different positions over the area of said pit, a supporting mast, bearing means on said trolley for supporting said supporting mast rotatably with respect to said trolley, means, suspended in said pit from said supporting mast when said supporting mast is so rotatably supported, for engaging and raising and lowering said component assemblies of at least one type, said engaging-raising-and-lowering means being rotatable with said supporting mast, fluid-pressure operable means mounted on said supporting mast and connected to said engaging-raising-and-lowering means, a fluid conductor positioned on said trolley and connected to said fluid-pressure operable means for supplying pressure fluid to said fluid-pressure operable means, a flexible cable tray connected to said supporting mast at one end, extending from said one end peripherally at least partly around said mast and thence departing from said mast and terminating at the opposite end a predetermined distance from said mast so that when said mast is rotated in one direction, said tray is wound peripherally on said mast and when said mast is rotated in the opposite direction, said tray is unwound peripherally from said mast, said fluid conductor, in passing between said fluid-pressure operable means and said trolley, extending through said cable tray, entering said tray near said one end and leaving said tray near said other end, said conductor following the winding and unwinding of said tray, said tray remaining substantially fixed at said opposite end as said tray is wound on and unwound from said mast, whereby said conductors are anchored near said opposite end as said mast is rotated, whereby the portions of said fluid conductor extending away from said tray from said opposite end to said trolley are not moved by the rotation of said supporting mast.

9. The apparatus of claim 8 wherein the cable tray has flexible sides and is positioned so that its flexible sides are aligned vertically one above the other.

10. The apparatus of claim 8 wherein the trolley is moveably supported on a bridge, said bridge being moveably supported on the containment, the said apparatus including pressure-fluid supply means mounted on said bridge and connected to the fluid conductor on said trolley by an additional conductor, an additional flexible cable tray connected to said bridge and extending to said trolley, said cable tray being extended or retracted as the trolley moves forward and backward on said bridge, said additional conductor passing through said cable tray and following movement of said cable tray, whereby the portions of the additional conductor between the fluid-pressure supply means and the cable tray and the additional conductor and the fluid conductor on said trolley are not moved by movement of the trolley.

11. Apparatus for refueling a nuclear reactor including a trolley, a mast, means, connected to said trolley, mounting said mast rotatable on said trolley relative to said trolley, facilities on said mast for producing operations involved in the refueling, said facilities being rotatable with said mast, conductors connected at first ends to said facilities and at second ends to said trolley, a cable tray connected at one end to said mast and extending from said mast at the opposite end, said conductors passing through said cable tray, the said conductors extending from said first ends to said one end, passing through said cable tray and after leaving said cable tray being connected to said trolley at said second ends, rotation of said mast in one direction winding said cable tray peripherally on said mast and rotation of said mast in the opposite direction unwinding said cable tray peripherally from said mast, whereby the portions of the conductors between said one end of said cable tray and said first ends and between said opposite end of said cable tray and said second ends remain positionally unaffected by the rotation of said mast.

12. The apparatus of claim 11 wherein the cable tray terminates at the opposite end at a substantial height above the trolley, the said apparatus including a generally columnar physical structure connected at the upper end to said opposite end of said cable tray and at its lower end to the trolley, the conductors passing along said structure from the cable tray to the trolley.

13. The apparatus of claim 12 including a junction box and a wire way mounted on the structure, the conductors being reconnected at their second ends to the terminals of the junction box and corresponding conductors from the junction box passing through the wire way to the trolley.

14. Apparatus for refueling a nuclear reactor, said reactor being disposed in a pit in a containment under water and having component assemblies, of at least one type, a trolley, said trolley having facilities for controlling said apparatus, a supporting mast, means for engaging and raising and lowering said component assemblies of at least one type suspended in said pit from said supporting mast, hoist means supported on said supporting mast, said hoist means having cables connected to said engaging-raising-and-lowering means for raising or lowering said engaging-raising-and-lowering means on operation of said hoist means, electric and fluid-pressure operable means connected to said engaging-raising-and-lowering means for operating said engaging-raising-and-lowering means, electric-and-fluid-conductor handling facilities supported on said supporting mast, electrical conductors connecting said controlling facilities on said trolley and said electrical-conductor-handling facilities on said supporting mast, electrical and fluid conductors extending from said handling facilities and connected to said electric-and-fluid-pressure operable means for supplying electricity and fluid-pressure to operate said operable means, and bearing means on said trolley supporting said supporting mast rotatably, said engaging-raising-and-lowering means, said electric and fluid conductors and said hoist means and its cables and said facilities rotating together and with said supporting mast on rotation of said supporting mast, whereby the restriction of the rotation of said supporting mast and the twisting of the electric and fluid conductors and the fouling of the hoist cables by the electric and fluid conductors which would result from rotation of said supporting mast and the engaging-raising-and-lowering means suspended from said supporting mast relative to said hoist means and said electric-and-fluid-conductor handling facilities are precluded, a flexible cable tray connected to said supporting mast at one end, extending from said one end peripherally at least partly around said mast and thence departing from said mast and terminating at the opposite end a predetermined distance from said mast so that when said mast is rotated in one direction said tray is wound peripherally on said mast and when said mast is rotated in the opposite direction said tray is unwound peripherally from said mast, said electrical conductors, passing between said controlling facilities on said trolley and said electrical-conductor-handling facilities on said supporting mast, through said cable tray, entering said cable tray near said one end and leaving said cable tray near said opposite end, the said electrical conductors following the winding and unwinding of said tray, said tray remaining fixed at said opposite end as said tray is wound on said mast or unwound from said mast, whereby said electrical conductors remain fixed at said opposite end as said mast is rotated, whereby the portion of said electrical conductors between said opposite end and said controlling facilities on said trolley remain fixed.

15. The apparatus of claim 14 wherein the facilities include reel means on which the electrical and fluid conductors are wound, said reel means paying out said electric and fluid conductors when said engaging-raising-and-lowering means is moved downwardly and retracting said electric-and-fluid conductors when said engaging-raising-and-lowering means is moved upwardly.

16. Apparatus for refueling a nuclear reactor, said reactor being disposed in a pit in a containment under water and having component assemblies, of at least one type, a trolley, said trolley being mounted on a bridge, the said apparatus including pressure-fluid supply means mounted on said bridge, a supporting mast, means for engaging and raising and lowering said component assemblies of at least one type suspended in said pit from said supporting mast, hoist means supported on said supporting mast, said hoist means having cables connected to said engaging-raising-and-lowering means for raising or lowering said engaging-raising-and-lowering means on operation of said hoist means, electric and fluid-pressure operable means connected to said engaging-raising-and-lowering means for operating said engaging-raising-and-lowering means, electric-and-fluid-conductor handling facilities supported on said supporting mast, electrical and fluid conductors extending from said handling facilities and connected to said electric-and-fluid-pressure operable means for supplying electricity and fluid-pressure to operate said operable means, said electrical and fluid conductors including a fluid conductor connecting said pressure-fluid supply means on said bridge and the fluid-conductor-handling facilities on said mast, and bearing means on said trolley supporting said supporting mast rotatably, said engaging-raising-and-lowering means, said electric and fluid conductors and said hoist means and its cables and said facilities rotating together and with said supporting mast on rotation of said supporting mast, whereby the restriction of the rotation of said supporting mast and the twisting of the electric and fluid conductors and the fouling of the hoist cables by the electric and fluid conductors which would result from rotation of said supporting mast and the engaging-raising-and-lowering means suspended from said supporting mast relative to said hoist means and said electric and fluid conductors handling facilities are precluded, said apparatus also including a flexible cable tray connected to said supporting mast at one end, extending from said one end peripherally at least partly around said mast, and then departing from said mast and terminating at the opposite end a predetermined distance from said mast, so that when said mast is rotated in one direction, said tray is wound peripherally on said mast and when said mast is rotated in the opposite direction, said tray is unwound peripherally from said mast, said fluid conductor passing between said pressure fluid supply means and said fluid-conductor-handling facilities entering said tray at said one end and leaving said tray at said opposite end, said fluid conductor following the winding and unwinding of said tray, said tray remaining fixed at said opposite end as said tray is wound on or unwound from said mast, whereby said fluid conductor is anchored near said opposite end of said tray as said mast is rotated and the portions of said fluid conductor between said pressure-fluid supply means and said opposite end of said tray are not moved by the rotation of said mast.

* * * * *